United States Patent
Wunderlich

(10) Patent No.: US 6,217,819 B1
(45) Date of Patent: Apr. 17, 2001

(54) UNIVERSAL SINGLE-ROW AND MULTI-ROW INSERT STRETCH BLOW MOLDING METHOD AND APPARATUS THEREFOR

(76) Inventor: Ernst Dieter Wunderlich, 55 Green Valley Dr., Warren, NJ (US) 07059

( * ) Notice: Subject to any disclaimer, the term of this patent is extended or adjusted under 35 U.S.C. 154(b) by 0 days.

(21) Appl. No.: 09/326,454

(22) Filed: Jun. 7, 1999

(51) Int. Cl.[7] .......................... B29C 49/06; B29C 49/20; B29C 49/64
(52) U.S. Cl. .................. 264/513; 264/516; 264/532; 264/535; 264/537; 425/111; 425/126.1; 425/525; 425/526; 425/533; 425/534; 425/541; 425/529; 425/523
(58) Field of Search .......................... 425/534, 541, 425/529, 523, 111, 126.1, 525, 526, 533; 264/513, 516, 535, 537, 532

(56) References Cited

U.S. PATENT DOCUMENTS

| | | | |
|---|---|---|---|
| 4,140,464 | * | 2/1979 | Spurr et al. .................. 425/533 |
| 4,310,282 | * | 1/1982 | Spurr et al. .................. 425/533 |
| 4,437,825 | * | 3/1984 | Harry et al. .................. 425/529 |
| 5,653,934 | * | 8/1997 | Brun, Jr. et al. ............. 425/534 |

* cited by examiner

Primary Examiner—Robert Davis
(74) Attorney, Agent, or Firm—Edward M. Fink

(57) ABSTRACT

In a single-row and expandable into a multi-row stretch blow molding method and apparatus, a robot having a universal gripper assembly is used to pick up molded preforms during the clamp opening stroke of a preform-molding unit and then transfer the preforms at variable time intervals to a conditioning, stretch blow molding and discharge unit, releases finished hollow articles and returns to a waiting position at the preform-molding unit independent of the preform-molding cycle. Simultaneously, component transfer devices pick up external components, i.e. labels, valves or handles during the stretch blow molding phase and release the components into the blow-mold cavities while the universal gripper assembly is in the waiting position. The universal gripper assembly can alternatively also be pivoted to pick up preforms from a lateral reheat unit to supplement the molded preform supply. A modular stack-blow-mold clamp assembly is equipped with a plurality of pivoting spacing means which open and close the blow-mold halves and align their respective parting lines to correspond with the center-row distances of the preform molds, conditioning and stretch blow means. Prior to the transfer of the molded preforms to a conditioning station, internal components, i.e. sleeves or liners can be inserted into the neck and body portion of the preforms. Further, a secondary robot with a gripper assembly can pick up pretreated preforms from the first set of blow molds and transfer them into one or several consecutive blow mold assemblies.

10 Claims, 16 Drawing Sheets

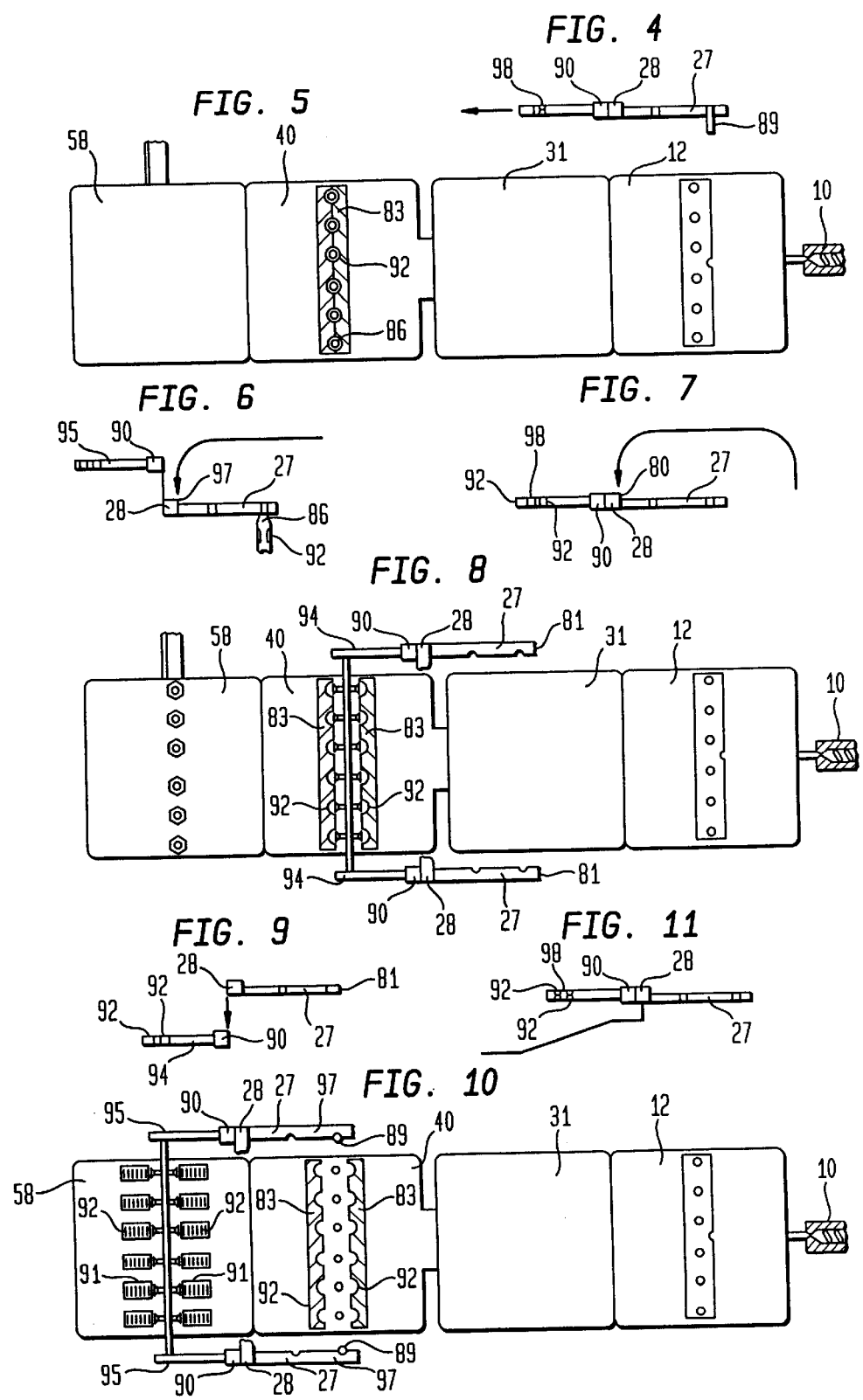

UNIVERSAL SINGLE-ROW AND MULTI-ROW INSERT STRETCH BLOW MOLDING METHOD AND APPARATUS THEREFOR

BACKGROUND OF THE INVENTION

1. Field of the Invention

This invention relates to a method for the preparation of preforms and hollow articles in single-row and multi-row preform and blow molds, respectively, and to an apparatus therefor. More particularly, the present invention relates to a method and apparatus, wherein a gripper assembly removes molded preforms either during a preform mold opening stroke or from a preform reheat unit, transfers the preforms through different processing phases, adding internal and external components during the transformation into hollow articles, and returns to a waiting position outside the preform molding or preform reheat unit.

2. Brief Description of the Prior Art

Heretofore, in conventional prior art molding machines, preforms are injected and transferred by their neck splits which are mounted beneath a horizontal transfer plate in an intermittent rotary motion of multi-station machines as described in U.S. Pat. Nos. 4,946,367 and 5,062,787. Apparatus described therein is dedicated to producing hollow articles in single-row molds. To increase production, the molder must acquire double-row rotary blow molding machines as described in U.S. Pat. Nos. 4,457,689, 4,941,816, and 5,062,787. Unfortunately, such machines evidence certain drawbacks, namely, the difficulty of mold interchangeability due to different swing radii and stack heights. In order to obviate such limitations, costly neck splits and neck split holders are required for each station. The rotary plates and the machine beds are required to be laid out for the higher clamping forces in the injection station. As a result, the increased inertia of the heavy construction and large swing radii of the transfer plates slows down the dead time of mold open index and mold close, thereby increasing the overall cycle times. Efforts to reduce dry cycle times have been made, as for example, by replacing the rotary tables through closed circuit conveyor devices as described in U.S. Pat. No. 4,895,509. However, once again, costly support jaws, mounted on slide guides, are required for each station linked together to transfer the preforms and containers through the forming phases in a rectilinear motion in equal distances and equal time intervals. In the rotary-type and chain-link-type method, all phases of preform molding, conditioning, stretch blowing, and discharging are also interdependent due to a common transfer movement. The larger the number and size of transfer components, the more machine component weight needs to be transferred, so resulting in slower dry cycles, and thus longer overall cycles.

The industry has recognized these limitations and has also recognized that containers can be conditioned, stretch blown, and discharged in a fraction of the time that it takes to mold the preforms. This discovery has led to a method and apparatus for injection stretch blow molding as described in U.S. Pat. No. 5,468,443, wherein a larger number of injection molding stations produce preforms to be conveyed to a lesser number of stretch blow molding stations. The drawback of this method and apparatus is that it requires neck split moving means for supporting and conveying neck splits adapted to hold-neck portions of each preform used to mold the hollow articles through all preform molding, conditioning, blow molding, and ejection stations.

Refinements of the aforementioned patent, U.S. Pat. No. 5,468,443, are described in U.S. Pat. Nos. 4,793,960, 5,753, 279, and 5,744,176, wherein molded preforms are first inverted to be released onto carrier members of a transfer conveying system. The preform carrier members are spread to correspond to the blow mold center distances. The inverted preforms are then indexed through a reheating section to ascertain that the first batch of molded preforms enters the blow mold station with the same temperature profile as the following batches of simultaneously molded preforms. Once the preforms are stretch blown into final hollow articles, they are inverted again to release them in an upright position. The limitation of this technique resides in the fact that the molten preforms need to be inverted and to be put onto a multitude of neck-size-dependent carrier members. Spreading mechanisms are needed to widen the carrier members to the corresponding blow molding center distances and reheat ovens are needed for maintaining equal temperature profiles in the preforms which enter the blow molds consecutively. The bottom up stretch blow molding method is prone to preform-sagging and results in thinner bottoms and heavier shoulders in the hollow articles. A second inverted device is then needed to release the finished hollow articles in an upright position. The number of injection cavities vs. blow cavities remains at a fixed ratio which limits the processing flexibility for lighter-wall vs. heavier-wall containers. A further stretch blow molding concept is described in U.S. Pat. Nos. 4,372,910 and 4,470,796 in which molded preforms are picked up by two-row multiple gripper transfer devices, then inserted one row at a time into neck-size dependent collars of the respective closed circuit transportation system to be subsequently indexed to the conditioning, stretch blow and ejection stations. The drawback of this system is that the preforms have to be transferred in two steps, a first one to pick up the preforms and a second one to put the same onto neck-size dependent collars. The secondary transfer system is a common closed loop belt drive which does not allow any timing flexibility between the simultaneous conditioning and stretch blow phases to obtain maximum processing flexibility. As described in European Patent No. EP 0,768,166, the conditioning system is required to be twice as long as the stretch blow system to ascertain uniform temperature profiles for the first and second row preforms being introduced. The reduction of the number of blow cavities relative to the preform mold cavities is offset by the need of the number of additional transfer devices and neck-size-dependent collars. U.S. Pat. No. 4,197,073 teaches a method, wherein alternate sets of parisons are released into laterally diverging tracks before arriving at the blow-molding unit. Despite the reduction in the number of blow mold cavities, in the end, the number of blowing means is equal to the number of preform mold means. U.S. Pat. No. 4,209,290 teaches a method wherein blow molding cells are interposed between open injection mold halves and injection cores with their preforms descend into the blow molding cells to form finished bottles. The drawback of this method is that the preform-molding cycle is interrupted during the time it takes to blow-mold the bottles.

U.S. Pat. Nos. 5,731,014, 4,718,845, and 4,706,924 disclose a solution for gaining maximum utilization of molding machines by simply switching mold cavities than complete molds in both stack molds and single-face mold versions clamped between a fixed and movable machine platen. This solution works well in conventional injection molding machines. However, in stretch blow molding machines, secondary components such as conditioning rods, blow cores, stretch rods, and bottom plugs, etc. need to be introduced at a predetermined center distance row. European Patent No. EP 0,768,165-A2 teaches a method wherein mutually coupled mold plates, connected to a power transmission means, actuate through motion transferring means a double pair of mold halves. U.S. Pat. No. 4,941,816 describes a double row clamp molding machine, wherein each blow mold row is closed by lateral moving means. Subsequently, pan cake cylinders rise between the two rows and expand to apply the necessary clamp pressure against oppositely located clamping means. Both methods are limited to a fixed number of two rows of blow molds at a fixed machine-dependent center row distance.

U.S. Pat. Nos. 5,683,729, 5,110,282, 4,824,359, and 4,403,907 refer to cam-driven rotary pick and place assemblies, which simultaneously carry preforms and hollow articles through the blow molding and release phases. The limitation of such carrying means is that their rotary motion is interdependent, requires space modifying devices and, therefore, does not allow any timing and stroke distance flexibility between the various processing phases. U.S. Pat. No. 5,653,934 teaches a method wherein the linearly moving, article-engaging elements constitute an integral part of the mold, which do not allow any molding operation during the movement in and out of the molding machine.

A method for adding external components such as labels, handles, or valves to the preforms or hollow articles is described in U.S. Pat. Nos. 4,479,770 and 4,721,451, wherein components, such as labels, are picked up from dispensing heads by the label carrier shuttle and are moved rectilinearly into an open mold wherein they are released onto the mold cavity walls and returned in the same manner to the dispensing head position. The drawback of this method is that the normal blow molding cycle of rotary machines is interrupted to allow the time to introduce the labels into the open mold cavities. Typically, finished containers have to be evacuated first and new preforms need to be delayed from entering the open mold cavities. U.S. Pat. No. 4,983,348 partially overcomes this limitation by opening the upper mold half earlier and inserting labels into the open mold half while holding the previously blown and labeled work pieces or hollow articles in the lower mold half for the duration of the label transfer phase without increasing the overall machine cycle time. The drawback of this method is that only one mold half can receive labels and the distance between the work piece and movable blow mold halves needs to be sufficient to allow the dispensing mechanism to operate in between.

To add secondary components to preforms or hollow articles, U.S. Pat. No. 5,678,771 teaches a method wherein an insert is attached on the surface above the threads of a neck finish to maintain stability during and after hot-fill processing. The drawback of this method is that the non-oriented, amorphous neck finish portion beneath the attached reinforced insert can shrink and deform during the hot-fill phase. U.S. Pat. No. 4,988,472 teaches a method that prevents the afore-mentioned drawback. However, the insert is placed into a neckring portion of an open mold first and then over-molded with molten material, an operation that lengthens the overall cycle.

U.S. Pat. No. 4,847,129 teaches a method of molding a multi-layer neck-finish structure whereby the center layer consists of a high temperature polymer.

U.S. Pat. Nos. 5,651,933 and 3,939,239 teach a method wherein thermoformed sleeves are put on injection cores and are overmolded to obtain a multi-layer preform. The inner overmolded layer needs to be stiff enough to withstand the following injection pressures when injecting the outer layer. Thus, this method requires more costly inner barrier material and is more difficult to bond with the overmolded material.

U.S. Pat. No. 5,516,274 describes a movable blow mold clamp assembly permitting improved access for servicing.

SUMMARY OF THE INVENTION

1. Purposes of the Invention

It is an object of the present invention to mold preforms in single-row or multi-row preform mold cavities in variable-row spacings to give the molder maximum flexibility in meeting small and large production output requirements. Preform molds can be mounted perpendicular or in line relative to one or several plasticizers.

It is a further object of the invention to utilize a robot with a universal gripper assembly which picks up molded preforms during the preform mold opening stroke, transfers the same across a conditioning, and stretch blow unit to be converted into hollow articles, and then transfers them into an oriented discharge unit at variable time and stroke intervals before returning to a waiting position.

It is a further object of the invention to freely move the robot with the universal gripper assemblies in horizontal and vertical directions to position the preforms into the different processing units to condition, stretch-blow and discharge the same.

It is a further object of the invention to lay out the grippers at a multitude of center distances to enable the transfer of preforms and hollow articles with different size neck finishes and at various mold cavity center distances.

It is a further object of the invention to maximize the production capabilities through stack molds, wherein each blow mold half is opened and closed instantly by pivoting spacing platens which are aligned with the center row distances of the corresponding stretch rod, blow core, and bottom plug assemblies. The number of spacing-platen rows can be increased or decreased according to the desired number of blow mold rows.

It is a further object of the invention to vary the center row distances in the conditioning, stretch-blow, and bottom plug units according to the center rows of the preform molds.

It is yet a further object of the invention to turn the conditioning and stretch blow mold units to match the number of preform mold rows.

It is a further object of the invention to add additional blow mold units for multi-stage stretch-blow mold applications.

It is a further object of the invention to add a robot with a secondary universal gripper assembly to transfer pretreated hollow articles from the first blow mold unit into subsequent blow mold and discharge units.

It is a further object of the invention to add component transfer devices to pick up components during the blow-molding phase and to introduce these components into the open blow molds during the waiting phase.

It is a further object of the invention to insert components on the neck inside of preforms before the shrinkage phase of the molten material has been completed.

It is a further object of the invention to insert components on the inside of the preform walls prior to the conditioning and stretch-blow-molding phase.

It is a further object of the invention to pivot the gripper assembly to pick-up reheated preforms from a lateral reheat oven assembly.

It is a further object of the invention to mount the upper conditioning and blow-clamp assemblies onto linear bearings enabling to move said clamp assemblies laterally to facilitate mold and machine component mounting.

2. Brief Description of the Invention

In accordance with the present invention, molten material is introduced into single-row or multi-row preform mold cavities. Upon completion of the solidification phase, the upper mold half is raised together with the injection cores. Immediately thereafter, during the mold-opening stroke, a robot with a universal gripper assembly enters between the movable mold halves and follows their movement to pick up the molded preforms on-the-fly. If the preform mold construction is such that the neck splits lift the preforms out of the preform mold cavities, the preforms are picked up below their transfer bead. If the preform mold construction is such that the neck splits stay with the preform cavities and are lifted out by the injection cores, the robot with the universal gripper assembly may pick up the preforms by the neck finish, as the injection cores are being fully retracted. Immediately after the robot with the universal gripper assembly transfers the preforms to the conditioning unit, the preform mold is closed again to mold the next set of preforms. The robot with the universal gripper assembly holds the preforms in the conditioning unit just long enough for the internal touch rods and external heater pots to monitor the temperature profile in the preforms. Next, the robot with the universal gripper assembly brings the conditioned preforms into the blow molds, wherein, after the bottom plugs have been raised and the molds have been closed, the blow cores and stretch rods descend to enter the preforms at their open ends, low and high pressure blow air comes on and forms finished hollow articles. Immediately upon completion of the stretch blow cycle, the blow cores and stretch rods lift out of the blow molds, the blow molds are opened, and the robot with the universal gripper assembly lifts the finished hollow articles out of the blow mold cavities to transfer the same into the oriented discharge unit. The robot with the now empty universal gripper assembly returns to a waiting position at the preform molding station. Due to the fast cooling nature of certain materials, such as PET or PEN, among others, the time periods necessary for conditioning, stretch-blowing, cooling, and oriented discharging, as well as for the short and quick transfer strokes of the robot with its light-weight universal gripper assembly and with its reduced inertia happen within a fraction it takes to mold the preforms.

In addition to the preform supply from the molding unit, outsourced preforms from an adjacent reheat unit can be supplemented. During this intermediate phase, the universal gripper assembly pivots and picks up reheated preforms from said reheat unit and transfers them the same way in a short linear movement through the conditioning, stretch blow, and oriented discharge phases.

In view of the freely programmable and time-independent movement of the robot with the universal gripper assembly, following component transfer devices can be added. During the stretch blow phase, these transfer devices pick up components such as labels, handles, valves, etc. When the robot with the universal gripper assembly has returned to the waiting position, the components are released into each blow mold half, all without any increase in the total cycle time.

The above described process shows that the number of blowing means is equal to the number of preform means. Therefore, to further boost production and to gain maximum utilization of the preform-molding unit, stack-blow molds are installed to meet the production of a larger number of preform cavities. The blow-mold clamp requirements are virtually the same with single-row or multi-row blow mold assemblies. A selectable number of pivoting spacer platens, located between the blow mold rows, provide instant mold opening and closing as well as parting-line alignment with the entering bottom plugs, blow core and stretch-rod assemblies mounted in a stationary position. A synchronized movement of the enveloping blow-mold clamping means provides the final blow-mold clamping pressure.

The injection core, conditioning and stretch-blow rods are held onto individual clamp bars. The clamp bars are bolted individually onto the machine clamp platens according to the center distance rows of the preform and blow-mold cavities. The neck splits or stripper plates and the blow cores are also mounted on individual clamp bars. These clamp bars are bolted individually onto frame-type machine clamp platens within the respective units. This flexibility in varying the center distance rows permits the mounting of existing molds, adding or deleting mold cavity rows, thereby increasing or decreasing mold opening daylights for the production of larger and smaller hollow articles, respectively.

The injection, conditioning, stretch-blow and oriented discharge units can be turned based on the preform mold design to minimize the number of universal gripper assemblies.

Certain molten materials such as PC or PP, heavy-wall returnable PET bottles, or heat-set PET bottles require stepped processing treatments to achieve specifications. In this case, additional blow-mold units and a secondary robot with a universal gripper assembly are installed. In this processing mode, once the principal robot with the universal gripper assembly has transferred the preforms into the first blow-mold assembly, it returns to the waiting position at the preform-molding machine. A secondary robot with a universal gripper assembly picks up the pretreated preforms and transfers them directly to one or several subsequent blow mold units and finally to an oriented discharge unit.

Hollow articles tend to deform in non-stretch-blow-molded areas such as the neck finishes during hot-fill operation. A unit capable of transferring internal components into preforms may be installed right after the preform-molding unit. An internal component transfer device picks up heat-stable sleeves from a sorting conveyor. The robot with the universal gripper assembly picks up the preforms from the preform-molding unit at elevated neck temperatures, thus before the shrinkage phase has been completed, and transfers them to an internal component transfer unit, wherein the heat-stable sleeves are released into the open-ended preforms. The sleeve-reinforced preforms are then transferred to a conditioning unit, wherein the cooling neck finishes shrink tightly onto the heat-stable sleeves. After passing through one or several stretch-blow units, neck heat-stable hollow articles are released into an oriented discharge unit.

To enhance the barrier properties of hollow articles, a thin inner liner of high-barrier material can be inserted the same way into the preforms by the internal component transfer device prior to transferring the same into a conditioning and stretch-blow unit.

The above-described stretch-blow molding method and apparatus provides the molder with maximum production flexibility by forming hollow articles in either single-row or multi-row blow-mold assemblies as well as processing versatility in adding additional stretch-blow mold units and introducing external and internal components to the hollow articles. The open architecture of the individual processing units permits the installation of molds from different machine designs and requires one set of neck splits in the preform mold only. The completely separate preform molding unit from all other processing units and preform pick-up "on-the-fly" allows the quickest mold opening and closing of the preform mold clamp. All the downstream phases described above happen within the preform-mold filling, forming and cooling phases. Thus, the preform molding phase and the rapid mold opening, preform take-out and mold closing phase constitutes the total processing cycle.

Adding an additional reheat unit further increases the output capabilities of the stretch blow-molding machine to meet seasonal market demands.

Prior art for robotic gripper assemblies requires removal of preforms from a molding unit or finished hollow articles from an ejection or blow-mold station of a stretch-blow-molding machine when in a static position and placing them onto conveying means. The improvement described herein involves the use of a robot with a universal gripper assembly to pick up molded preforms from a preform molding unit during the mold-opening stroke or from a reheat oven and transferring them at freely programmable intervals to a multitude of individual processing units performing multiple functions, such as conditioning, stretch-blowing, adding internal or external components, or hand-over pre-treated hollow articles to subsequent stretch-blow units prior to final release of the finished hollow articles. In this capacity, the robot with the universal gripper assembly replaces the use of heavy rotary transfer plates carrying neck splits for each station, or circulatory carriers with neck-mold moving pieces, or carriages with neck-size-dependent support jaws, each being linked together in a closed circuit.

Prior art for multi-row blow-mold clamps requires that each blow mold row is first closed by external moving means. Subsequently, a pancake cylinder assembly is raised in between the rows which are expanded to apply the necessary clamp pressure against opposite clamping cylinders on each end, or a power transmission means is used to actuate, through motion-transferring means, a double pair of mold halves only.

In accordance with the present invention, a multitude of pivoting spacing platens is mounted to instantly create a blow mold row opening and closing action within selected center distance rows. Synchronized peripheral clamping means are then used to apply the necessary closing force. A further refinement involves the flexibility of adding or deleting spacing platens depending on the desired number of blow-mold rows. The benefits to the molder are to adapt production outputs to market demands within the same stack-mold clamping means. The higher output rate capabilities of stack-blow-mold assemblies make in-line hollow article filling and pasteurization economical with the one-step process.

BRIEF DESCRIPTION OF THE DRAWINGS

The invention will be more readily understood by reference to the following detailed description taken in conjunction with the accompanying drawing wherein:

FIGS. 4–11 show a schematic sequence of a robot with a universal gripper assembly, followed by a transfer component device assembly in conjunction with a stretch-blow molding sequence;

FIG. 4 shows a schematic side view of a robot with a universal gripper assembly picking up a molded preform and a transfer component device assembly in a stand-by position;

FIG. 5 shows a schematic top view of a stretch-blow molding sequence showing from right to left a plasticizer, a preform-molding unit, a conditioning unit, a stretch blow molding unit in a closed position with external components applied, and an oriented discharge unit;

FIG. 6 shows a schematic side view of a robot with a universal gripper assembly holding a hollow article with external components applied as well as a transfer component device assembly in an external component pick-up position;

FIG. 7 shows a schematic side view of a robot with a universal gripper assembly in a finished hollow article discharge position and a transfer component device assembly holding external components on a front and back side;

FIG. 8 is a schematic top view of a stretch-blow molding sequence showing from right to left a plasticizer, a preform molding unit, a conditioning unit, a stretch-blow molding unit in an open position ready to receive external components by a transfer component device assembly, a universal gripper assembly in a waiting position, and an oriented discharge unit;

FIG. 9 shows a schematic side view of a robot with a universal gripper assembly in a waiting position and a transfer component device assembly in an external component-release position;

FIG. 10 shows a schematic top view of a stretch-blow molding sequence showing from right to left: a plasticizer, a preform molding unit, a conditioning unit, a stretch-blow molding unit in an open position holding external components, such as labels in each mold half, a transfer component device assembly in a component-pick-up position and a universal gripper assembly in a stretch-blow position, front and back component-dispensing cartridges, above an oriented discharge unit;

FIG. 11 shows a schematic side view of a robot with a universal gripper assembly ready to pick up a preform and a component transfer device assembly in an external component stand-by position;

DETAILED DESCRIPTION OF THE INVENTION

In accordance with the present invention there is provided a single-row and multi-row stretch blow molding method and apparatus, wherein a robot with a universal gripper assembly picks up molten preforms from a preform-molding unit during the mold-opening stroke and guides them through the steps of conditioning, stretch-blow molding, oriented discharging, and then returns to a waiting position at the preform-molding unit. The freely programmable time and stroke intervals of the robot with the universal gripper assembly to complete the stretch blow molding process are substantially faster than the preform molding process and thus allows the pick-up of additional preforms from a reheat unit and the introduction of components to the external and internal walls of the hollow articles without increasing the overall cycle. A modular stack-blow-mold assembly provides the opportunity for increased production in the same blow molding apparatus. A further set of robots with universal gripper assemblies and blow mold units provide the opportunity to treat the preforms in multi-stages before being released as hollow articles into an oriented discharge unit.

Figure 1:
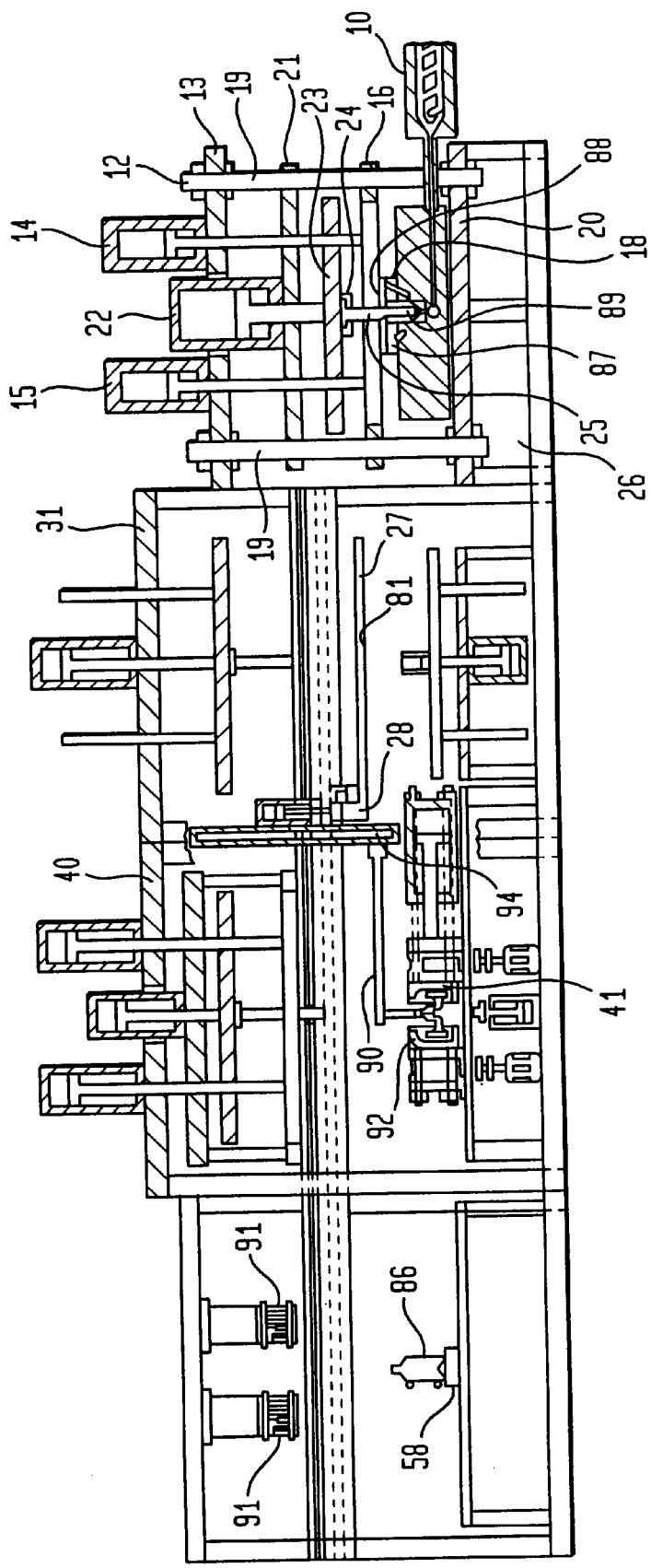
FIG. 1 is a side view of a stretch-blow molding method and apparatus showing from right to left a plasticizer, a preform molding unit, a conditioning unit, a robot with freely programmable universal gripper assembly in a waiting position, a component-transfer device assembly, a stretch blow mold unit, an oriented discharge unit beneath front and back component dispensing cartridges.

With reference now more particularly to the drawings, FIG. 1 is a side view of a stretch-blow molding method and apparatus, showing from right to left a plasticizer 10, a preform-molding unit 12 with a preform-mold-cavity assembly 26 in a closed position mounted on a base frame 20, wherein the neck splits 18 remain in sliding connection 87 with the preform-mold-cavity assembly 26 upon raising the frame-type platen 16 holding the ejector bar 88 by the vertical clamp cylinders 14 and 15. Tie bars 19 connect the base platen 20 with the upper clamp platen 13. A movable intermediary clamp-platen housing 21 is connected to the frame-type clamp platen 16. A central clamp cylinder 22 is mounted onto the intermediary clamp-platen housing 21 which moves the injection core-holding platen 23 with the injection-core-mounting bar 24 and injection cores 25. During the opening movement of the frame-type clamp platen 16, a universal gripper assembly 27, mounted onto a robot 28, starts entering the opening clamp area and follows its upward movement. As the central clamp cylinder 22 moves the injection cores 25 upwards beyond the ejector bar 88, the universal gripper assembly 27 grasps the freeing molded preforms 89 and transfers them to a conditioning unit 31 and from there into a stretch-blow-molding unit 40 to form the hollow articles 86 which are subsequently released in an oriented discharge unit 58, and returns to a waiting position 81.

A following transfer component device assembly 90, which has picked up external components 92 from front and back component dispensing cartridges 91 during a previous stretch-blow molding phase, places the same external components 92 into the open blow molds 41 in its component release position 94 during the waiting phase of the universal gripper assembly 27.

Figure 2:
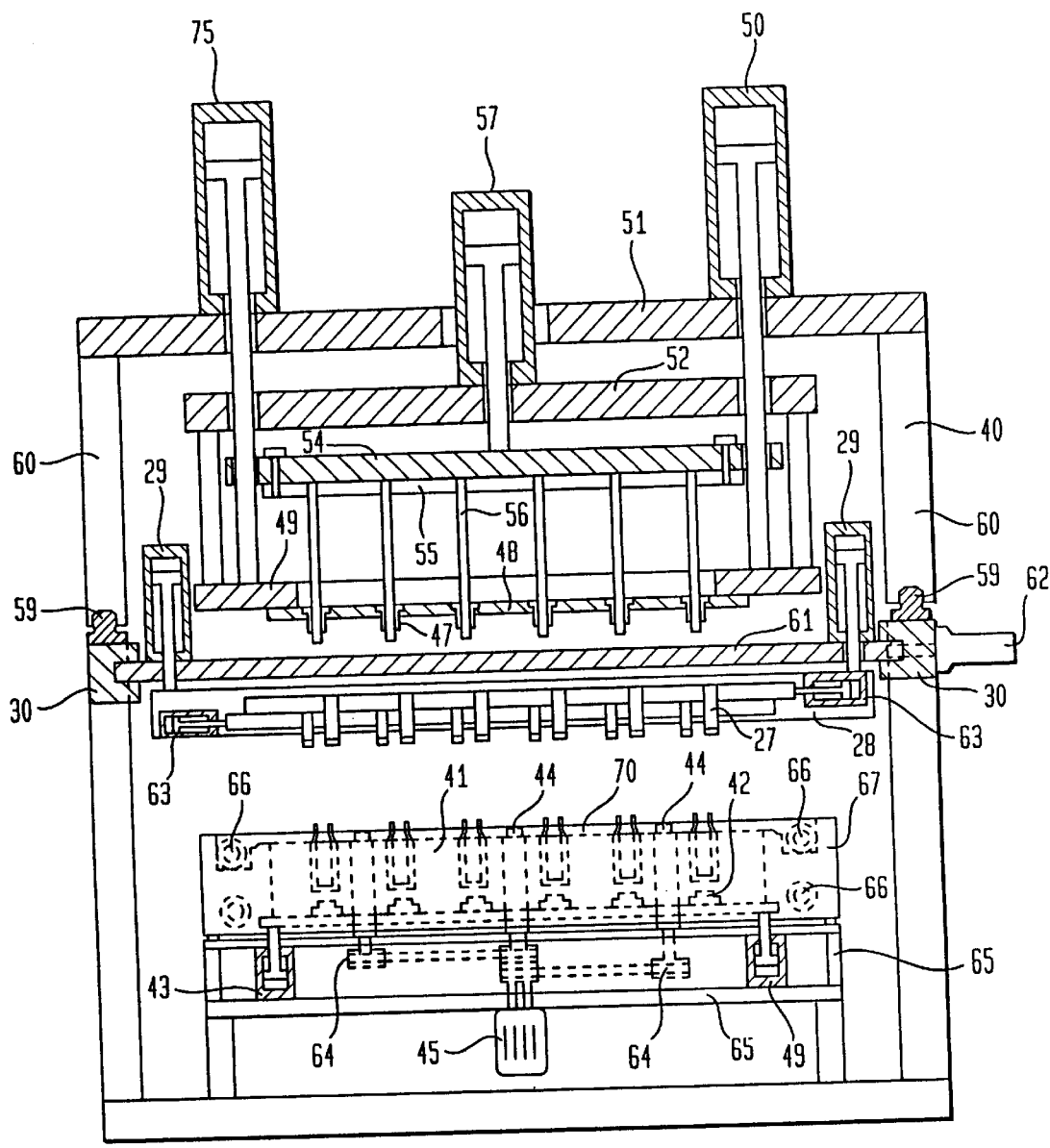
FIG. 2 is a front view of a stretch-blow molding unit with clamp cylinders, a stretch rod assembly, a blow core assembly mounted on linear bearings, a robot with a universal gripper assembly and drive, a blow-mold clamp assembly with pivoting spacing platens and drive means as well as bottom plug moving means.

FIG. 2 shows a front view of a stretch blow molding unit 40, wherein the upper portion 60 with the upper moving-means platen 51 on which are mounted the vertical stretch-blow moving means 50 and 75 that drive the blow cores 47 which are mounted on a frame-type platen 49 with blow-core holding bars 48 and intermediary stretch-rod clamp-platen housing 52 having central stretch-rod moving means 57 mounted onto the frame-type blow-core clamp platen 49 holding the stretch rods 56, which are mounted on a stretch-rod holding platen 54 with stretch-rod holding bars 55 which ride on linear bearings 59 enabling the upper portion to slide out of its operating position to facilitate the mold change-over procedure. A track rail 30 guides a traversing beam 61, which is monitored by a drive 62. Traversing beam 61 carries robot 28 with the vertical gripper moving means 29 and the gripper opening and closing means 63 of the universal gripper assembly 27. A stretch-blow mold assembly 41 is located beneath the upper portion 60 of the stretch blow unit 40 mounted between blow mold clamp platens 67 attached to tie bars 66. Pivoting spacing platens 44 monitored by rotating means 45 and drive gears 64 are mounted in between the blow mold-cavity assembly 41, onto a support frame 65 and upper center cross bars 70. Bottom-plug rows 42 are monitored by moving means 43 mounted onto a support frame 65.

Figure 3:
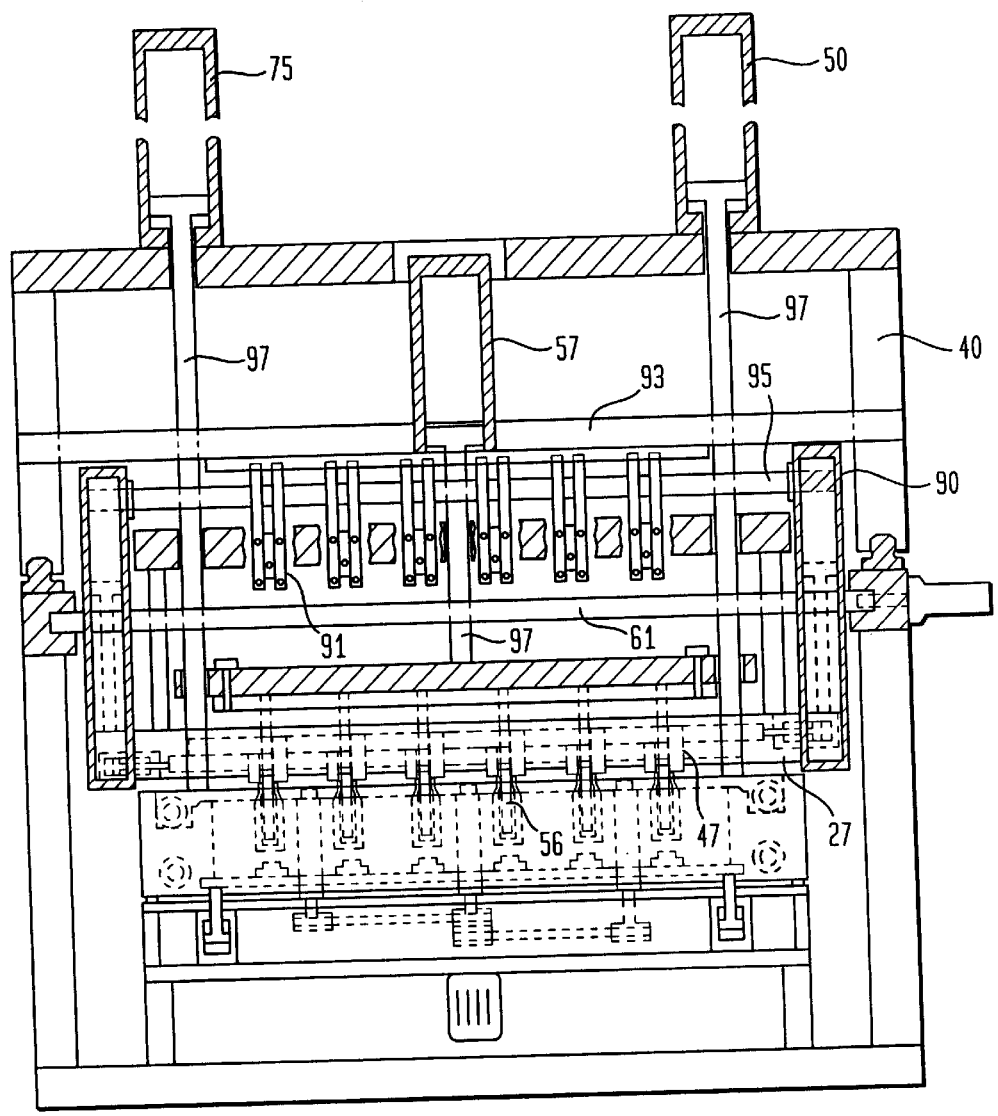
FIG. 3 is a back view of a stretch-blow molding unit and component-dispensing assembly showing from top to bottom the blow-clamp cylinders, the component dispensing cartridges, a robot with the component-transfer device assembly in a component pick-up position, a universal gripper assembly holding the hollow articles in the blow-mold assembly, the pivoting spacing platen with drive means, and the bottom-plug moving means.

FIG. 3 is a back view of a stretch-blow mold unit 40 as described in FIG. 2. A frame assembly 93 in front of the stretch blow unit 40 holds the front and back component dispensing cartridges 91. A following transfer component device assembly 90, mounted on a traversing beam 61, is in its component pick-up position 95 while the universal gripper assembly 27, the blow cores 47, and stretch rods 56 are in a stretch-blow molding position 97.

FIGS. 4 to 11 show a schematic sequence of a robot 28 with a universal gripper assembly 27 followed by a transfer component device assembly 90 in conjunction with a stretch-blow molding sequence.

FIG. 4 shows a schematic side view of a robot 28 with a universal gripper assembly 27 picking up a molded preform 89 and a transfer component device assembly 90 in a stand-by position 98.

FIG. 5 is a schematic top view of a stretch blow molding sequence showing from right to left a plasticizer 10, a preform molding unit 12, a conditioning unit 31, a stretch-blow molding unit 40, a gripper assembly (not shown), wherein external components 92 are being applied in the closed stretch-blow-mold assembly 83 onto finished hollow articles 86 and a finished hollow article discharge unit 58.

FIG. 6 shows a schematic side view of a robot 28 with a universal gripper assembly 27 in a hollow article stretch blow molding position 97 and a finished hollow article 86 with external components 92 applied as well as a transfer component device assembly 90 in an external component pick-up position 95.

FIG. 7 shows a schematic side view of a robot 28 with a universal gripper assembly 27 in a finished hollow article discharge position 80 and a transfer component device assembly 90 in a stand-by position 98 holding external components 92 on the front and back side.

FIG. 8 is a schematic top view of a stretch blow molding sequence showing from right to left a plasticizer 10, a preform molding unit 12, a conditioning unit 31, a stretch blow molding unit 40, wherein in an open stretch blow mold assembly 83 external components 92 are going to be placed by a transfer component device assembly 90 in a component release position 94 and a universal gripper assembly 27 mounted on a robot 28 in a gripper waiting position 81 and a finished hollow article discharge unit 58.

FIG. 9 shows a schematic side view of a robot 28 with a universal gripper assembly 27 in a waiting position 81 and a transfer component device assembly 90 holding on the front and back side external components 92 in a component release position 94.

FIG. 10 is a schematic top view of a stretch blow molding sequence showing from right to left a plasticizer 10, a preform molding unit 12, a conditioning unit 31, a stretch-blow molding unit 40, wherein in the open stretch-blow mold assembly 83 external components 92 had been placed during the gripper-waiting phase, and a universal gripper assembly 27 mounted on a robot 28 holds molded preforms 89 placed between the closing stretch blow mold assembly 83 in a stretch blow molding position 97 while a transfer component device assembly 90 located above the oriented discharge unit 58 picks up external components 92 from the front and back component dispensing cartridges 91 in its component pick-up position 95.

FIG. 11 shows a schematic side view of a robot 28 with a universal gripper assembly 27 ready to pick up preforms (not shown) from a preform molding unit (not shown) and a component transfer device assembly 90 in a component stand-by position 98 holding front and back components 92.

Figure 12:
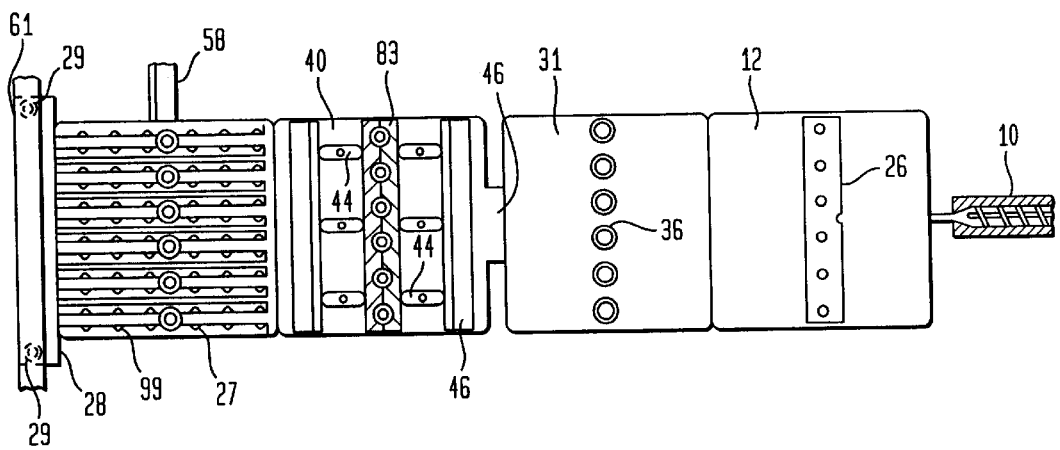
FIG. 12 is a top view of a single-row stretch-blow molding apparatus showing from right to left a plasticizer, a preform-molding unit, a conditioning unit, a stretch-blow unit and stack blow mold clamp assembly with pivoting spacing platens, and an oriented discharge unit with a universal gripper assembly.

FIG. 12 is a top view of a single-row stretch-blow mold apparatus showing from right to left: a plasticizer 10, a preform mold cavity assembly 26, in a preform molding unit 12, a set of heat pots 36 in a conditioning unit 31, a single-row blow-mold assembly 83 with pivoting spacing platens 44 and a stack blow-mold clamp assembly 46 in a stretch-blow molding unit 40, positioned in line to a traversing robot 28 with a universal gripper assembly 27 mounted onto a traversing beam 61 and its vertical upper moving means 29 also attached to a traversing beam 61 releasing finished hollow articles onto a lateral oriented discharge unit 58. A multitude of cut-outs in the gripper arms 99 at a multitude of mold cavity center distances allow transfer of preforms and hollow articles with different neck finish sizes and center distances.

Figure 13:
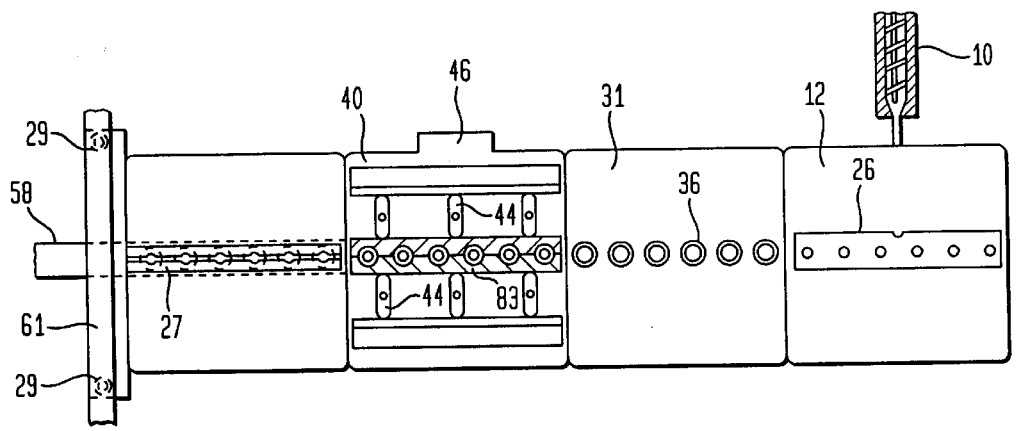
FIG. 13 is a top view of a single-row stretch-blow mold apparatus, as shown in FIG. 12, in which the plasticizer, preform-molding unit, conditioning unit, stretch-blow unit, and oriented discharge unit have been turned to minimize the number of universal gripper assemblies mounted onto the robot.

FIG. 13 is a top view of a single-row stretch-blow mold apparatus as shown in FIG. 12 in which the plasticizer 10, the preform mold unit 12 with a preform-mold-cavity assembly 26, the conditioning unit 31 with a set of heat pots 36, the stretch blow molding unit 40 with a single-row blow mold assembly 83 with pivoting spacing platens 44, and blow mold clamp assembly 46 have been turned perpendicular to a traversing robot 28 with a single-row universal gripper assembly 27 and vertical moving means 29, located on the traversing beam 61, releasing finished hollow articles onto an in-line oriented discharge unit.

Figure 14:
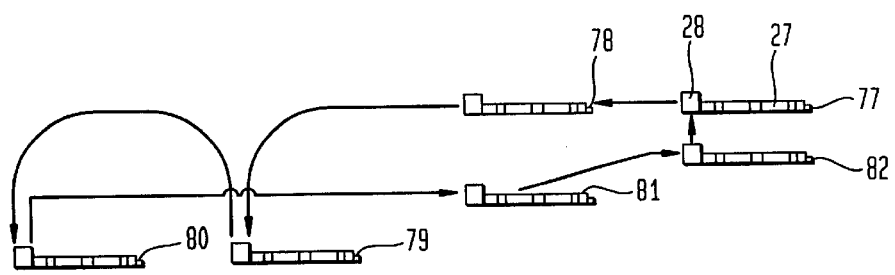
FIG. 14 shows a schematic movement of a universal gripper assembly as from right to left starting at a take-out position of a preform molding unit, traversing to a conditioning unit, descending onto a stretch-blow unit, retracting to an oriented discharge unit, returning to a waiting position, and ascending back into an opening preform molding unit.

FIG. 14 shows a schematic movement of a traversing robot 28 with a universal gripper assembly 27 for a stretch-blow molding method and apparatus, starting from right to left at a molded-preform take-out position 77, traversing to a preform-conditioning position 78, descending onto a preform-stretch-blow molding position 79 where the preforms are stretch-blown into hollow articles, retracting to a finished hollow article oriented discharge position 80, returning to a gripper-waiting position 81, and ascending back towards a preform-pick-up position 82.

Figure 15:
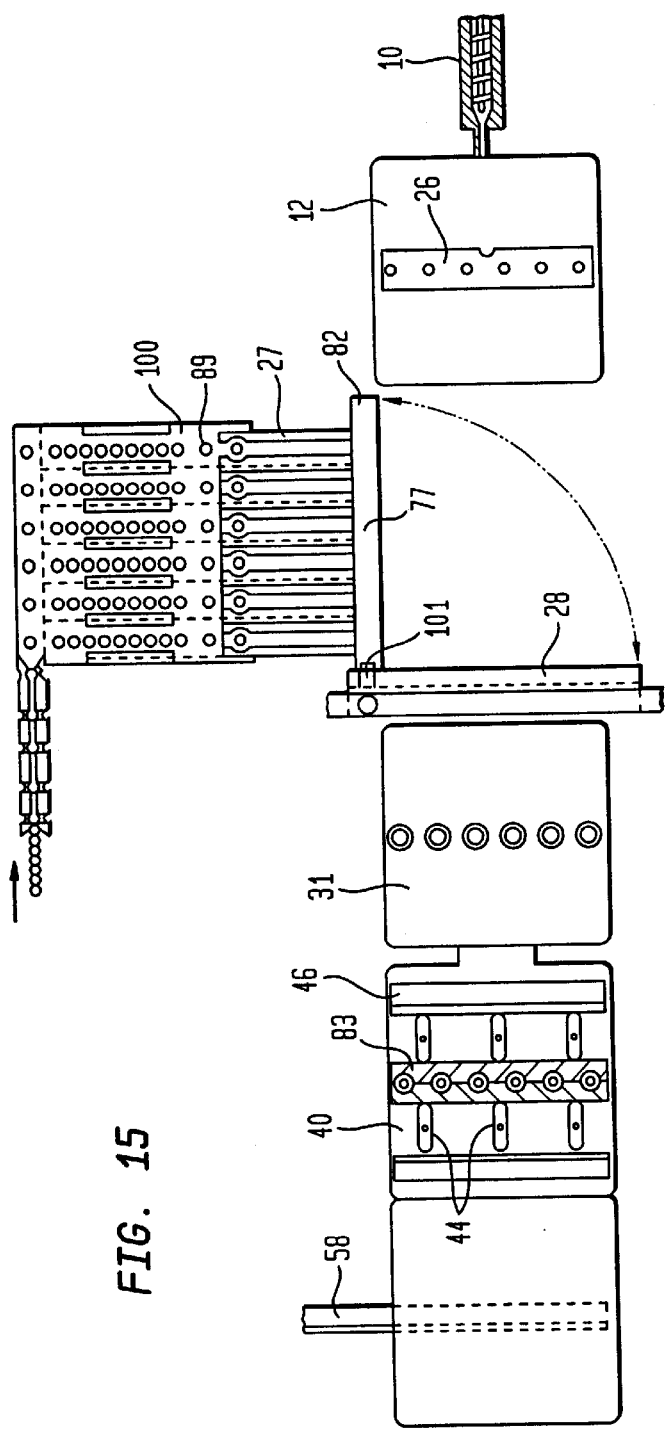
FIG. 15 is a top view of a single-row stretch-blow molding apparatus with a robot and a pivoting universal gripper assembly picking up preforms from a reheat unit and transferring the same through a conditioning and stretch-blow unit into an oriented discharge unit.

FIG. 15 is a top view of a single-row stretch blow molding apparatus as described in FIG. 12 except between the preform mold unit 12 with its preform mold cavity assembly 26 and the conditioning unit 31 is installed a preform reheat unit 100. The universal gripper assembly 27 has been pivoted into a preform take-out position 77 by gripper rotating means 101, connected to the robot 28 to pick up reheated preforms 89 to be transferred through the conditioning unit 31, the stretch-blow mold unit 40 where they are transformed into hollow articles and released into the oriented discharge unit 58.

Figure 16:
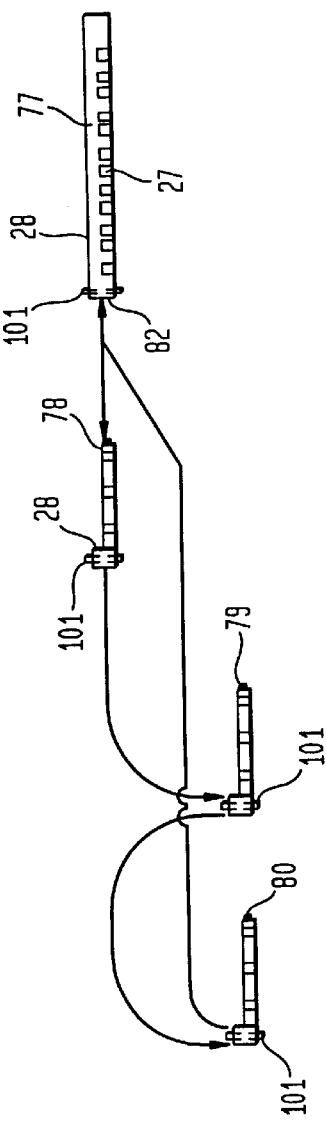
FIG. 16 shows a schematic side view sequence of a robot with a universal gripper assembly in a pivoted position, picking up reheated preforms from a reheat unit, pivoting back to its basic position to bring them to a conditioning unit, releasing them into a stretch-blow unit for transforming into hollow articles, retracting them toward an oriented discharge unit, and returning to a reheat unit.

FIG. 16 shows a schematic sequence from right to left of a robot 28 with a universal gripper assembly 27 pivoted by the gripper rotating means 101 into a preform take-out position 77, then being returned by same gripper rotating means 101 into a basic traversing mode to enter a preform conditioning position 78 descending onto a preform stretch blow molding position 79, where the preforms are being stretch-blown into hollow articles, retracting to a finished hollow article oriented discharge position 80, returning to a universal gripper preform pick-up position 82.

Figure 17:
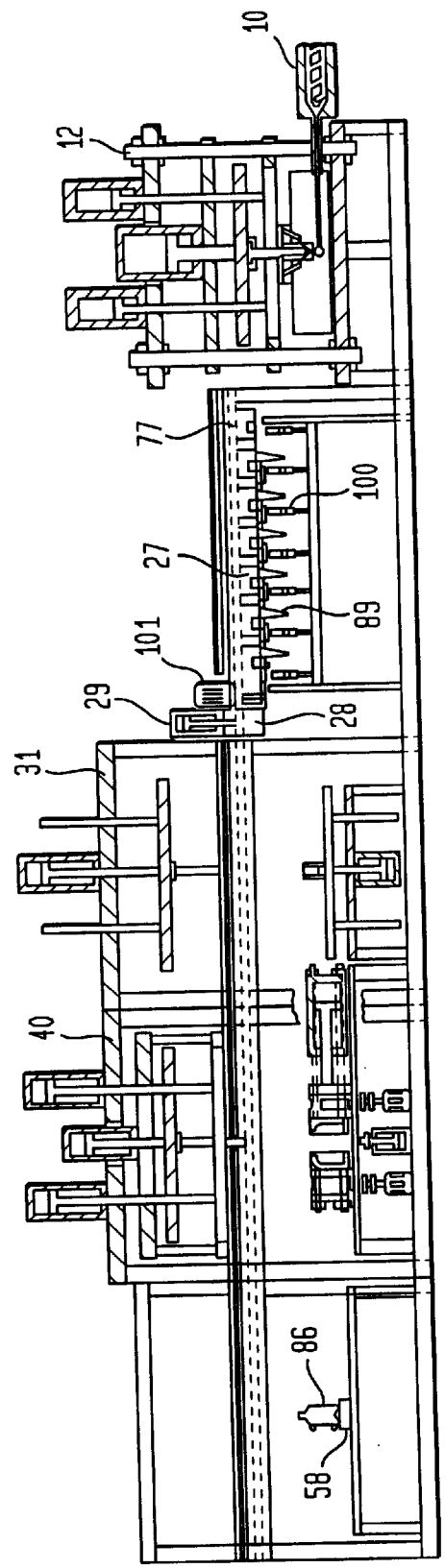
FIG. 17 is a side view of a single-row stretch blow molding apparatus showing from right to left a plasticizer, a preform molding unit, a robot with a universal gripper assembly in a pivoted position, a reheat unit behind, a conditioning unit, a stretch-blow unit, and an oriented discharge unit.

FIG. 17 is a side view of a single-row stretch blow molding apparatus as described in FIG. 1 with a plasticizer 10 and a preform molding unit 12. A robot 28 with gripper moving means 29 is equipped with gripper rotating means 101 that pivot a universal gripper assembly 27 into a preform take-out position 77 to pick up preforms 89 from a lateral preform reheat unit 100 and returns to its basic position to guide the preforms through a conditioning unit 31 and a stretch blow unit 40 to be stretch-blown into hollow articles 86 which are released in an oriented discharge unit 58.

Figure 18:
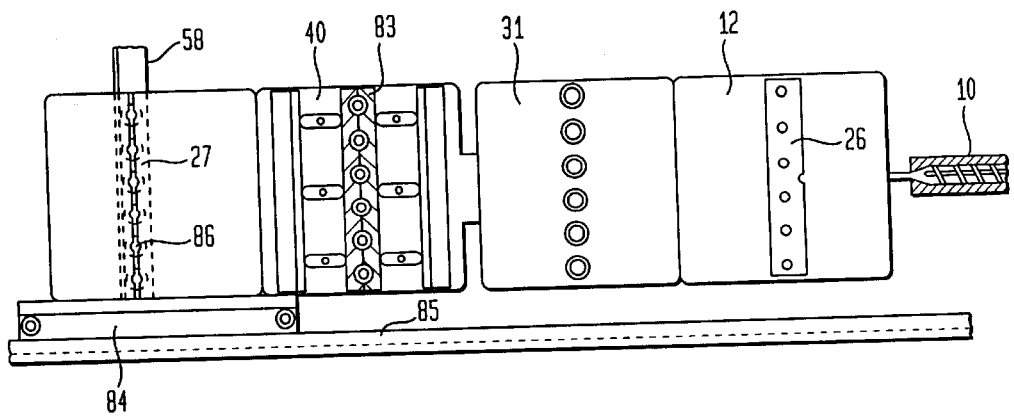
FIG. 18 is a top view of a single-row stretch blow molding apparatus as shown in FIG. 12, wherein a robot together with the universal gripper assembly indexes along a lateral guide rail.

FIG. 18 is a top view of a single-row stretch-blow molding apparatus as shown in FIG. 12, wherein a robot 84 indexes sideways together with a universal gripper assembly 27 along a lateral guide rail 85 to pick up molded preforms from an opening preform-mold-cavity assembly 26 in the preform-molding unit 12, indexes the same into a conditioning unit 31, descends into a single-row blow mold cavity assembly 83 in a stretch-blow molding unit 40, where preforms are stretch-blown into hollow articles, and retracts into an oriented discharge unit 58 to release finished hollow articles 86.

Figure 19:
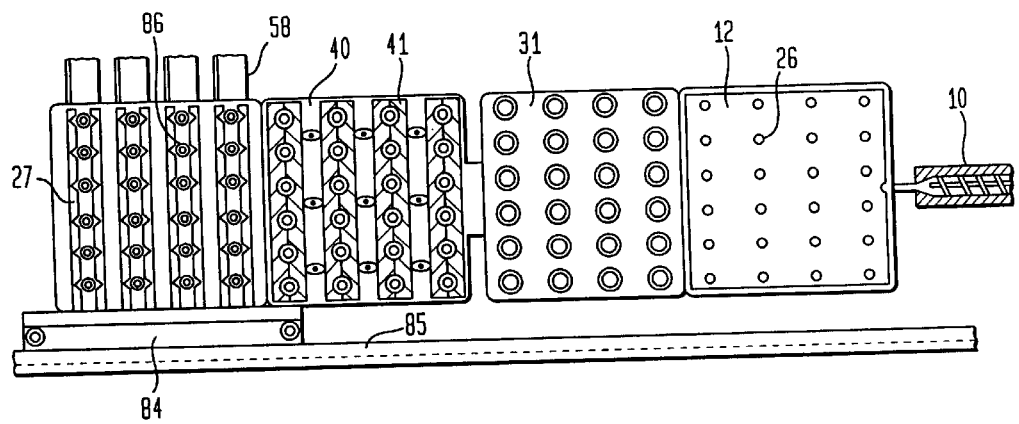
FIG. 19 is a top view of a multi-row stretch blow molding apparatus wherein a robot together with a universal gripper assembly indexes along a lateral guide rail.

FIG. 19 is a top view of a multi-row stretch-blow molding apparatus as shown in FIG. 12, wherein a robot 84 indexes sideways together with a universal gripper assembly 27 along a lateral guide rail 85 to pick up molded preforms from an opening preform mold cavity assembly 26 in a preform molding unit 12, indexes the same into a conditioning unit 31, descends into a multi-row stack-blow mold cavity assembly 41 in a stretch-blow molding unit 40, wherein the preforms are stretch-blown into hollow articles, and retracts into an oriented discharge unit 58 to release the finished hollow articles 86.

Figure 20:
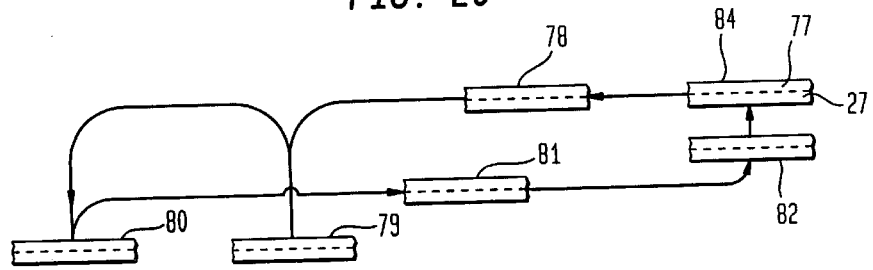
FIG. 20 shows a back view of a schematic movement of a laterally indexing robot with a universal gripper assembly from right to left, starting at a take-out position in the preform-molding unit, moving to a conditioning unit, descending onto a stretch-blow unit, retracting to an oriented discharge unit, returning to a waiting position, and ascending back to an opening preform-molding unit.

FIG. 20 shows a back view of a schematic movement of a laterally indexing robot 84 indexing sideways with a universal gripper assembly 27 starting from right to left, at a preform-take-out position 77, indexing to a preform-conditioning position 78, descending onto a preform-stretch-blow-molding position 79, where the preforms are stretch-blown into hollow articles, retracting to a finished-hollow-article-discharge position 80, returning to a gripper-waiting position 81, and ascending back towards a preform-pick-up position 82.

Figure 21:
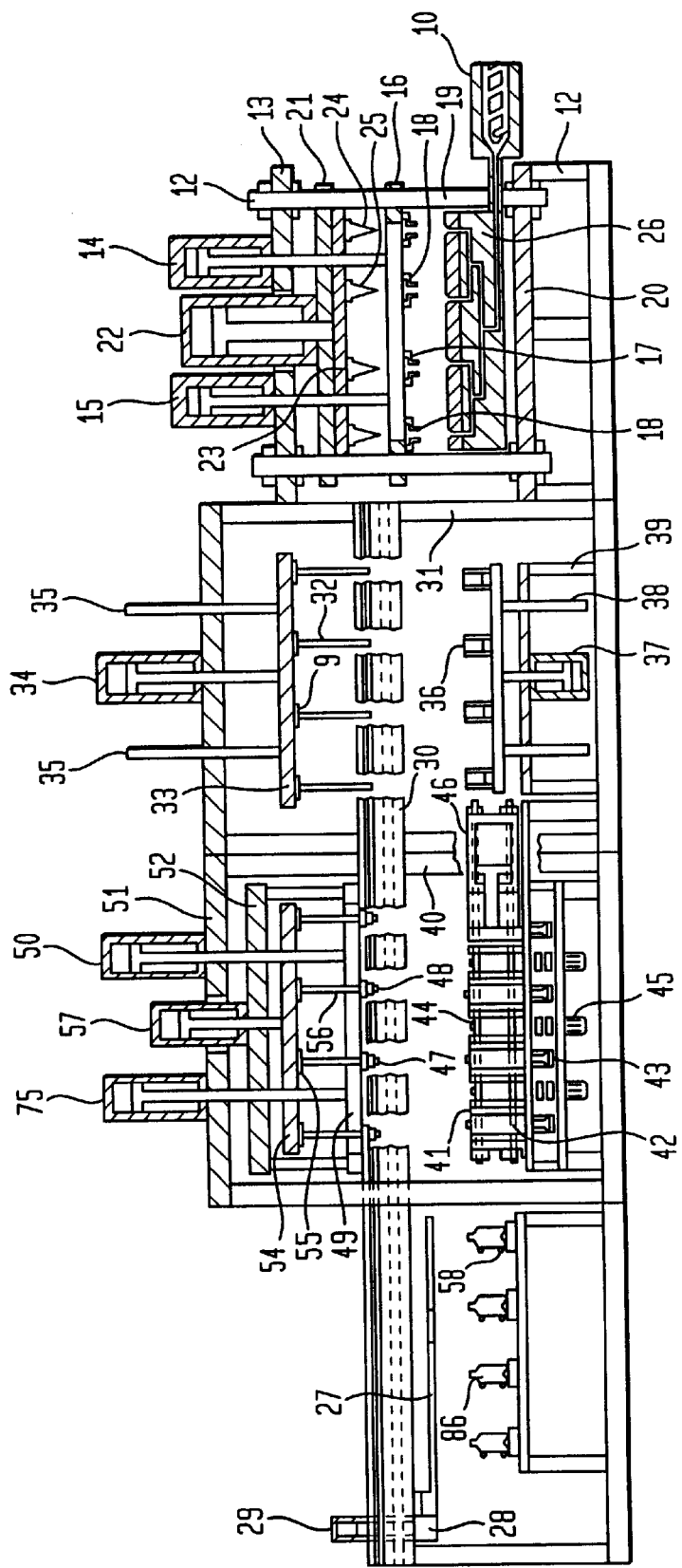
FIG. 21 is a side view of a multi-row stretch blow molding apparatus showing from right to left a plasticizer, a preform-molding unit, a conditioning unit, a stretch blow unit, an oriented discharge unit, and a robot with universal gripper assembly.

FIG. 21 is a side view of a multi-row stretch-blow molding method and apparatus showing from right to left a plasticizer 10, a preform-molding unit 12 consisting of an upper clamp platen 13 with vertical clamp cylinders 14 and 15 connected to a frame-type clamp platen 16 holding the neck split mounting bars 17 and neck splits 18. The frame-type clamp platen 16 slides up and down on tie bars 19 which are connected to the base platen 20 and the upper clamp platen 13. An intermediary clamp platen housing 21 is connected to the frame-type clamp platen 16. A central clamp cylinder 22 is mounted onto the intermediary clamp platen housing 21 which moves the injection core holding platen 23 with the injection core mounting bars 24 and injection cores 25. A preform mold cavity assembly 26 is mounted onto the base frame 20. The preform-molding cycle starts when the frame-type clamp platen 16 with the neck-split mounting bars 17 and neck splits 18 have been lowered onto the mold cavity assembly 26 by the vertical clamp cylinders 14 and 15, and the injection cores 25 have entered the preform mold cavity assembly 26.

Upon completion of the preform molding phase, both the frame-type platen 16 and the intermediary clamp platen housing 21 are raised together by the vertical clamp cylinders 14 and 15. A universal gripper assembly 27, mounted onto a robot 28 with a vertical moving means 29, slides on track rails 30 to enter between the opening preform-molding area of the fixed preform mold cavity assembly 26 and neck splits 18, and follows their upward movement. The central clamp cylinder 22 lifts the injection cores 25 out of the molded preforms (not shown). The moment neck splits 18 have been opened by a spreading device (not shown), the universal gripper assembly 27 picks up the preforms (not shown) and guides them to the conditioning unit 31. The preform-mold cavity assembly 26 is closed again to mold a new set of preforms. The conditioning rods 32 held by individual mounting bars 9 and mounted upon the base plate 33, connected to a central conditioning rod clamp cylinder 34 and guide rods 35, descend into the preforms (not shown). A set of heat pots 36 are raised around the preforms (not shown) by central raising means 37 and aligned by guide rods 38 mounted on a base unit 39. Upon completion of the conditioning phase, the conditioning rods 32 and the heat pots 36 retract. The universal gripper assembly 27 indexes the preforms into the stretch-blow-molding unit 40 and lowers them into stretch-blow molds 41 with the gripper moving means 29. Bottom plugs 42 are raised by bottom plug moving means 43. Rotating means 45 pivot spacing platens 44 to close the blow-mold halves 41. The blow-mold clamp assembly 46 with synchronizer (not shown) generates the final clamp closing pressure. Simultaneously, blow cores 47 held by blow core holding bars 48, mounted onto a frame-type blow-core clamp platen 49, are lowered onto the preforms (not shown), held in the closed blow-mold cavities 41 by vertical moving means 50 and 75, mounted onto the upper moving means platen 51. An intermediary stretch-rod clamp-platen housing 52, mounted onto the frame-type blow-core clamp platen 49 follows the blow-core movement. Central stretch-rod moving means 57, mounted onto the intermediary stretch-rod clamp-platen housing 52, connected to the stretch-rod holding platen 54, with the stretch-rod mounting bars 55 holding stretch rods 56 and moves stretch rods 56 into the preforms (not shown). Upon completion of the stretch-blow phase, vertical stretch-blow moving means 50 and 75 as well as stretch-rod moving means 57 retract to their upper positions, the universal gripper assembly 27 is raised by the gripper moving means 29 and retracts the finished hollow articles 86 to an oriented discharge unit 58.

Figure 22:
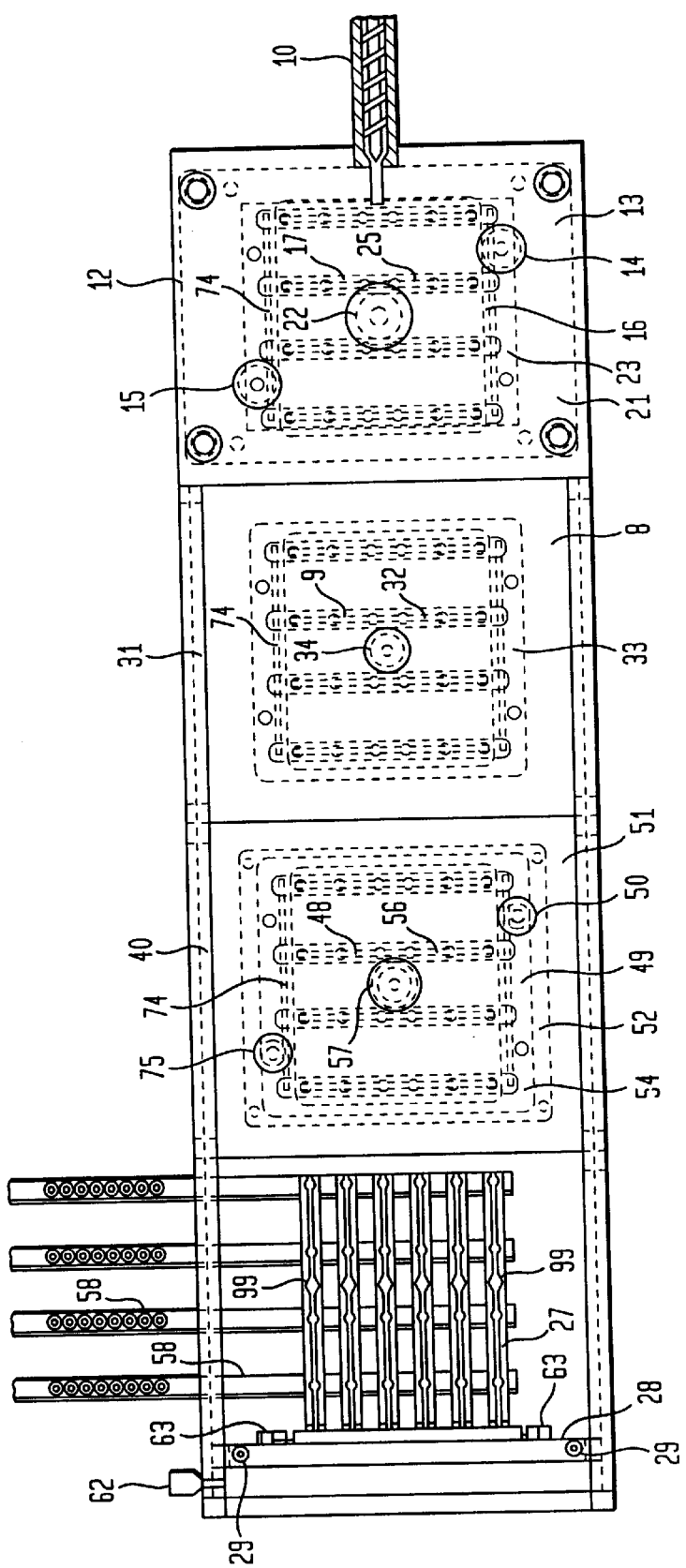
FIG. 22 is a top view of a multi-row stretch-blow molding apparatus with individual clamping means showing from right to left a plasticizer, an injection-core holding platen, and rows of neck-ring holding bars mounted onto a frame-type clamp platen beneath, a conditioning rod-holding platen and rows of conditioning rod-holding bars mounted beneath, a stretch-rod holding platen, and rows of blow-core holding bars mounted onto a frame-type clamp platen beneath, an oriented discharge unit beneath a robot with a universal gripper assembly, and a drive mounted onto a traversing beam rail frame of the robot.

FIG. 22 shows a top view of a stretch-blow molding method and apparatus consisting of plasticizer 10, preform molding unit 12, conditioning unit 31, stretch-blow molding unit 40, all equipped with upper moving-means platens 13, 8, and 51 holding vertical clamping means 14, 15, 34, 50, and 75, respectively. Beneath are located the intermediary clamp platen housings 21 and 52 holding central clamp cylinders 22 and 57. Central clamp cylinders 22, 34, and 57 are connected to holding platens 23, 33, and 54, respectively, under which are held in place on individual mounting bars 24, 9, and 55 the injection cores 25, the conditioning rods 32, and the stretch rods 56, respectively. Beneath the holding platens 23 and 54 are located the individual mounting bars 17 and 48 to hold the neck splits 18, and blow cores 48 onto frame-type clamp platens 16 and 49, respectively, with elongated mounting holes 74 which permit variations in the center row distances according to the preform mold cavity center distances. Mounting bars 9 for the conditioning rods are bolted in elongated slots 74 onto the holding platen 33. The top view further shows a universal gripper assembly 27 with opening and closing means 63 mounted onto a robot 28 monitored by a drive 62 and gripper moving means 29 and an oriented discharge unit 58 beneath. A multitude of cut-outs in the gripper arms 99 at a multitude of mold cavity center distances allows to transfer preforms and finished hollow articles with different neck finish sizes and center distances.

Figures 23, 24:
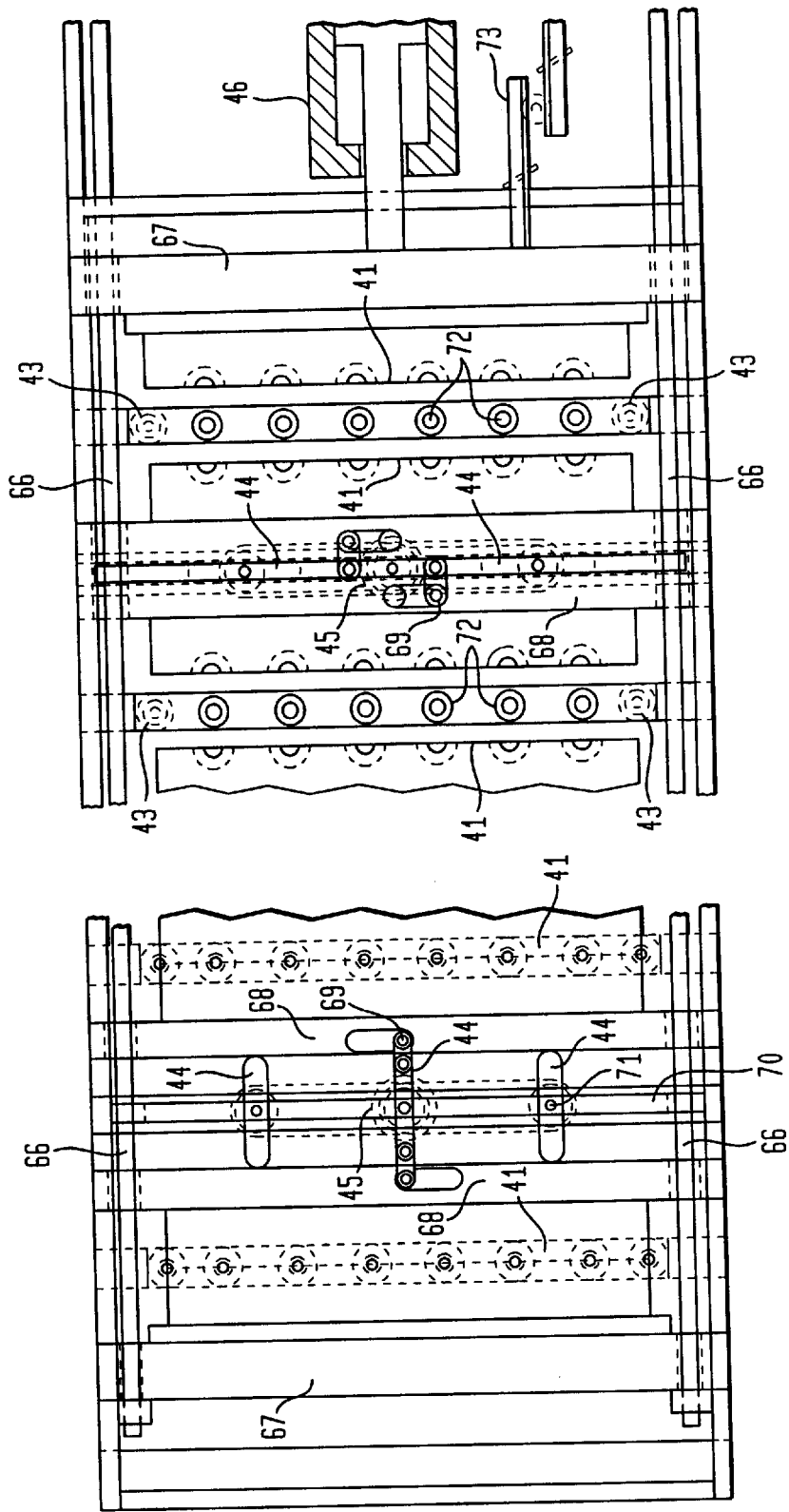
FIG. 23 is a stack-blow mold assembly section in a closed position with the spacing platens assembly in an extended position.
FIG. 24 is a stack blow mold assembly section in an open position with the spacing platens assembly in a retracted position showing the rows of bottom plugs, a clamp cylinder, and a clamp-platens synchronizing gear mechanism.

FIG. 23 is a top view of a multi-row stack-blow mold cavity assembly 41 in a closed position with pivoting spacing platens 44 in an extended position driven by rotating means 45, wherein the stretch-blow mold mounting platens 68 are directly attached and extended by a hinge mechanism 69. Center-cross bars 70, attached to blow-mold tie bars 66, serve as a fixed center pivot point for the center axis 71 of the pivoting spacing platens 44. Synchronized blow-mold clamp platens 67 generate the necessary clamp closing force.

FIG. 24 shows a multi-row stack-blow mold cavity assembly 41 in an open position with pivoting spacing platens 44 and hinge mechanism 69 in a retracted position. Bottom plug rows 72 and bottom-plug-moving means 43 are shown between the open multi-row stack blow mold halves 41. Blow mold clamp cylinder 46, monitored by a clamp platen synchronizer assembly 73, opens outer blow-mold clamp platens 67 attached to blow-mold tie bars 66.

Figure 25:
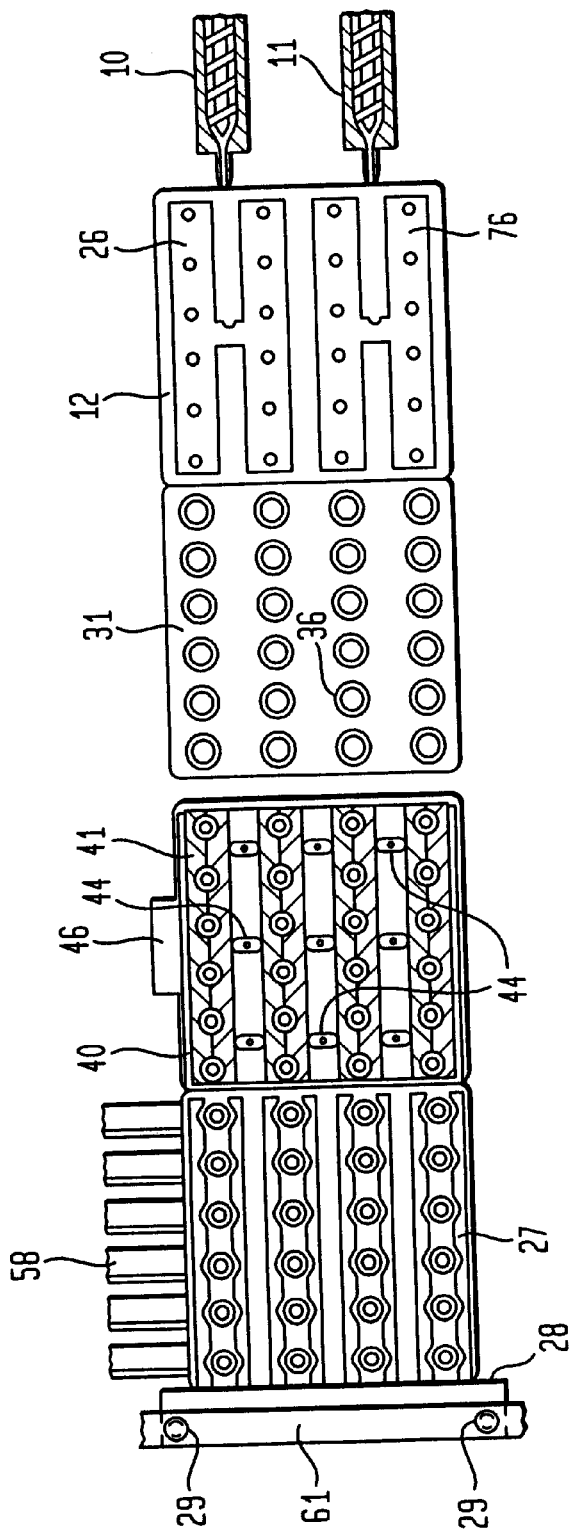
FIG. 25 is a top view of a multi-row stretch blow molding apparatus showing from right to left the plasticizers, a preform-molding unit, a conditioning unit, a stretch blow unit with stack-mold assembly and spacing platens, an oriented discharge unit with a robot and universal gripper assembly.

FIG. 25 shows a top view of a multi-row stretch-blow molding apparatus with, from right to left: plasticizers 10 and 11, a multitude of preform-mold-cavity assemblies 26 and 76 in preform molding unit 12, a set of heat pots 36 in conditioning unit 31, multi-row stack blow mold 41 in a stretch-blow unit 40 with pivoting spacing platens 44 and blow-mold clamp assembly 46 turned perpendicular two the traversing robot movement, a universal gripper assembly 27 mounted onto a robot 28 with gripper-assembly moving means 29 located on a traversing beam 61 and an oriented discharge unit 58 beneath.

Figure 26:
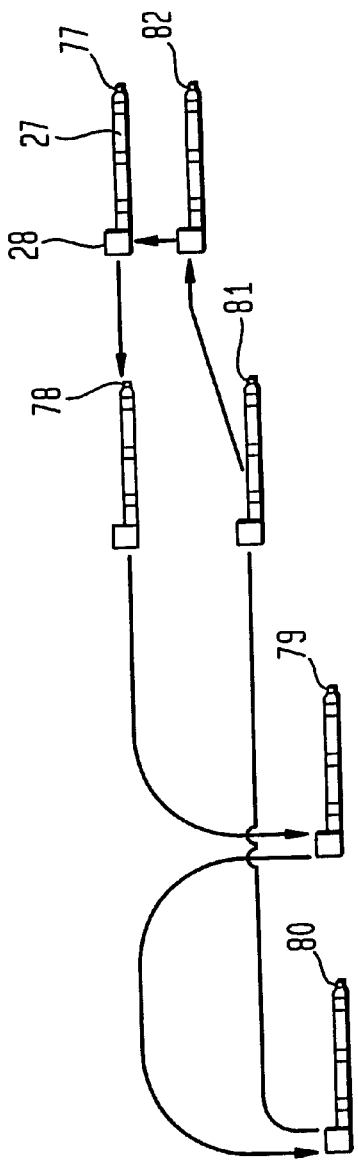
FIG. 26 shows a schematic movement of a universal gripper assembly from right to left starting at a take-out position of a preform-molding unit, traversing to a conditioning unit, descending onto a stretch-blow unit, retracting to an oriented discharge unit, returning to a waiting position, and ascending back into an opening preform-molding unit.

FIG. 26 shows a schematic movement of a robot 28 with a universal gripper assembly 27, starting from right to left at a molded-preform take-out position 77, traversing to a preform conditioning position 78, descending onto a preform-stretch-blow molding position 79, where the preforms are stretch-blown into hollow articles, retracting to a finished hollow article oriented discharge position 80, returning to a gripper waiting position 81, and ascending back towards a preform pick-up position 82.

Figure 27:
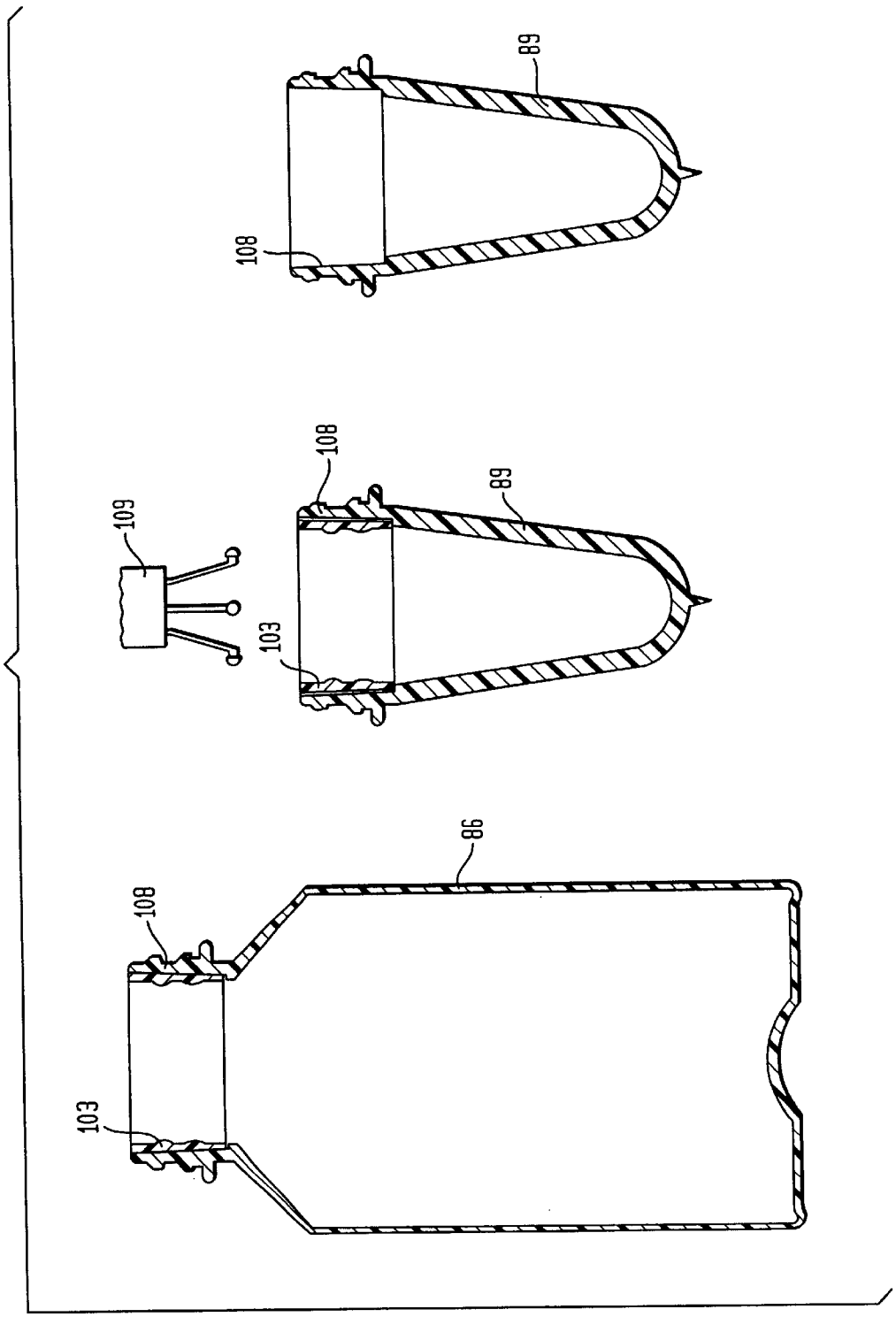
FIG. 27 is a sequential view of a molded preform with internal component preparation, an internal component pick-up and inserting device, a molded preform with an inserted internal component and a finished hollow article with an inserted internal component.

FIG. 27 is a sequential side view from right to left of a molded preform 89 with a neck section 108 at an elevated temperature to receive an internal component before the shrinkage phase has been completed. An internal component pick-up and inserting device 109 having positioned an internal component 103 in the neck section 108 of a molded preform 89 while still at an elevated temperature. An internal component 103 is shrunk into the neck section 108 of a stretch-blown hollow article 86 during the conditioning, the stretch-blow and the cooling phase.

Figure 27A:
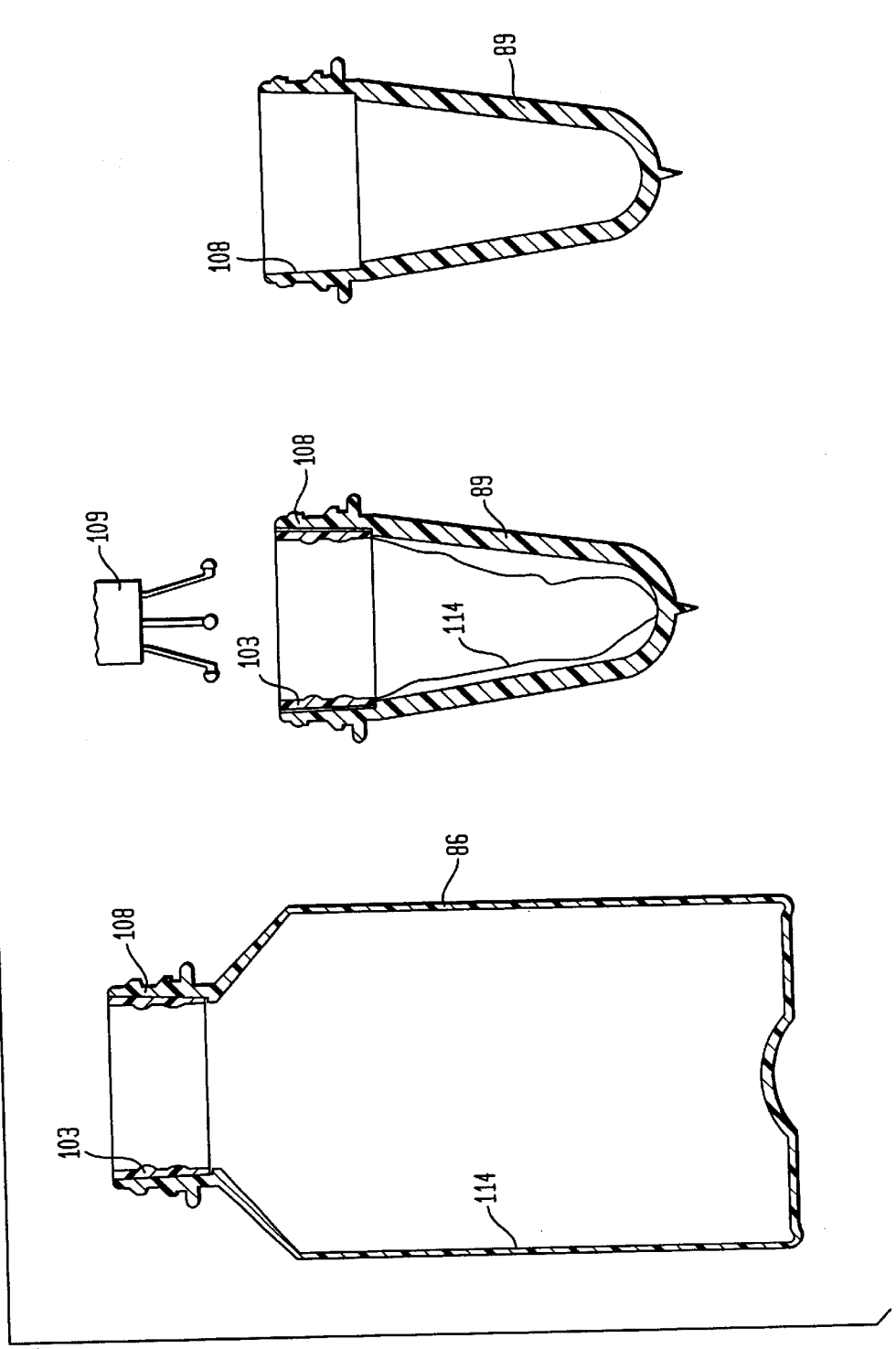
FIG. 27a is a sequential view of the molded preform as shown in FIG. 27 wherein an inner liner has been inserted into the preform and a multi-layer hollow article has been formed.

FIG. 27a is the same sequential view shown in FIG. 27 with the exception that an internal component 103 with inner liner 114 has been placed in a molded preform 89 while still at an elevated temperature. The molded preform 89 is being stretch-blown into a multi-layer hollow article 86 with an internal component 103 and inner liner 114 in intimate contact with the neck 108 and body portion of the hollow article 86.

Figure 28:
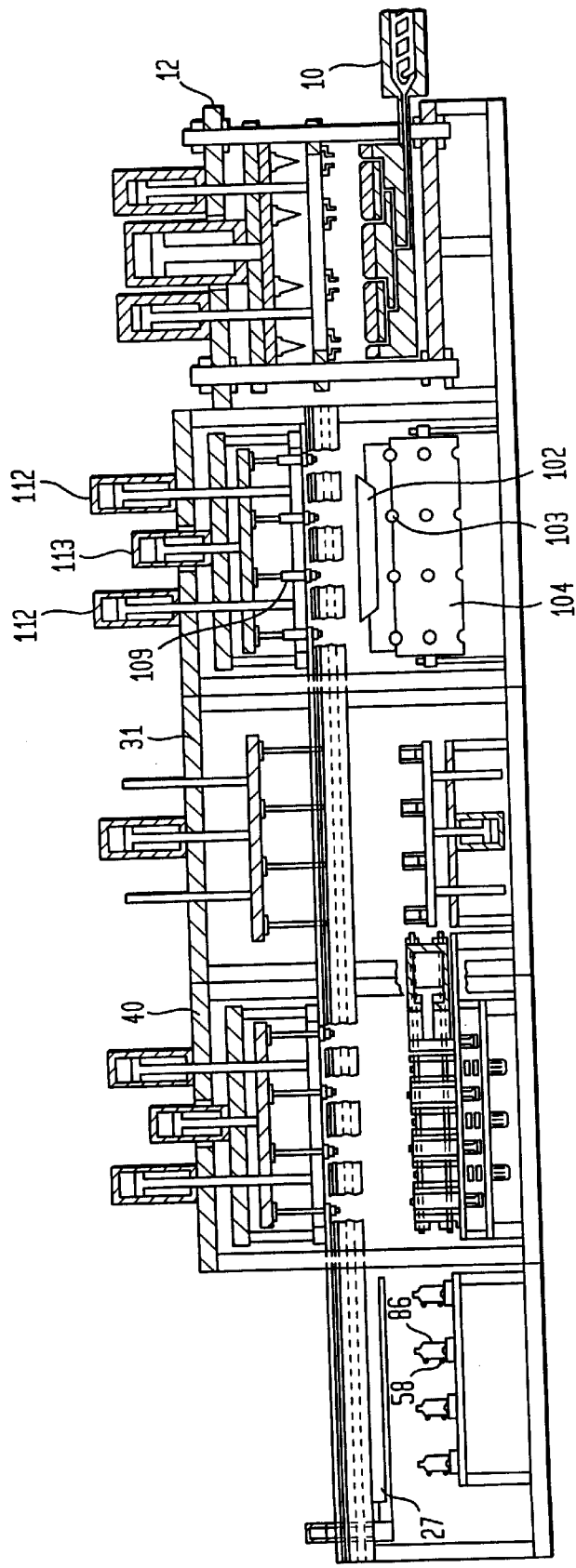
FIG. 28 is a side view of a multi-row stretch-blow molding apparatus showing from right to left: a plasticizer, a preform molding unit, an internal component sorting and conveying unit and an internal component pick-up and inserting unit, a conditioning unit, a stretch-blow unit, an oriented discharge unit, and a robot with a universal gripper assembly.

FIG. 28 is a side view of a multi-row stretch-blow molding apparatus as described in detail in connection with FIG. 21 showing from right to left a plasticizer 10, preform molding unit 12, with an internal component sorting unit 102 and an indexing sorting conveyor 104 which brings internal components 103 beneath a multitude of internal component pick-up and inserting devices 109. The component pick-up and inserting devices 109 are lowered towards the internal components 103 or internal components with inner liners 114 (not shown) in position on the indexing sorting conveyor 104 by moving means 112 and pick up the internal components 103 through monitoring motions of the central moving means 113. Internal components 103 are held in a waiting position (not shown) until the universal gripper assembly 27 transfers the molded preforms with internal component preparation 108 (not shown) at elevated temperature in position and then places the internal components 103 (not shown) or internal components with inner liners (not shown) into the molded preforms (not shown) prior to the completion of the shrinkage phase of the molded preforms.

The reinforced molded preforms (not shown) are then transferred to a conditioning unit 31, lowered into a stretch blow molding unit 40 and transformed into hollow articles 86 with reinforcing internal components 103 (not shown) or internal components with liners 114 (not shown) are stretch-blown into multi-layer hollow articles (not shown) which are retracted onto an oriented discharge unit 58.

Figure 29:
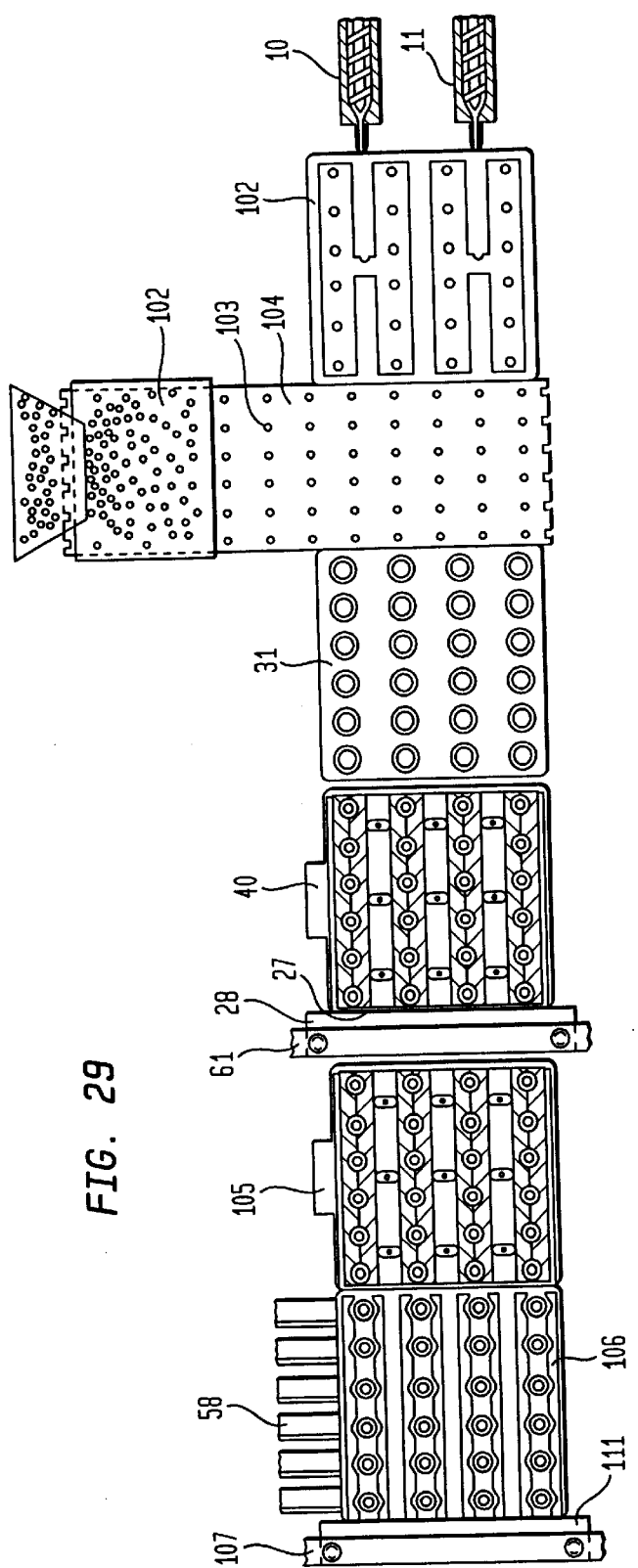
FIG. 29 shows a schematic top view of a multi-row stretch blow molding apparatus as shown in principle in FIG. 25 from right to left: the plasticizers, a preform molding unit, an internal component-indexing sorting conveyor unit, a conditioning unit, a stretch-blow molding unit, a robot with universal gripper assembly, as well as a secondary stretch-blow molding unit, a secondary robot with a secondary universal gripper assembly above an oriented discharge unit.

FIG. 29 is a schematic top view of a multi-row stretch-blow-molding apparatus as described in detail in connection with FIG. 25 showing from right to left the plasticizers 10 and 11, respectively, the preform molding unit 12, with sorting unit 102 to line up internal components 103 or internal components with inner liners 114 (not shown) onto an indexing sorting conveyor 104, a conditioning unit 31, a stretch blow unit 40, robot 28, with a universal gripper assembly 27 mounted on a traversing beam 61, as well as a secondary stretch blow molding unit 105, an oriented discharge unit 58 beneath a secondary robot 111 with a universal secondary gripper assembly 106 mounted onto a secondary traversing beam 107.

Figure 30:
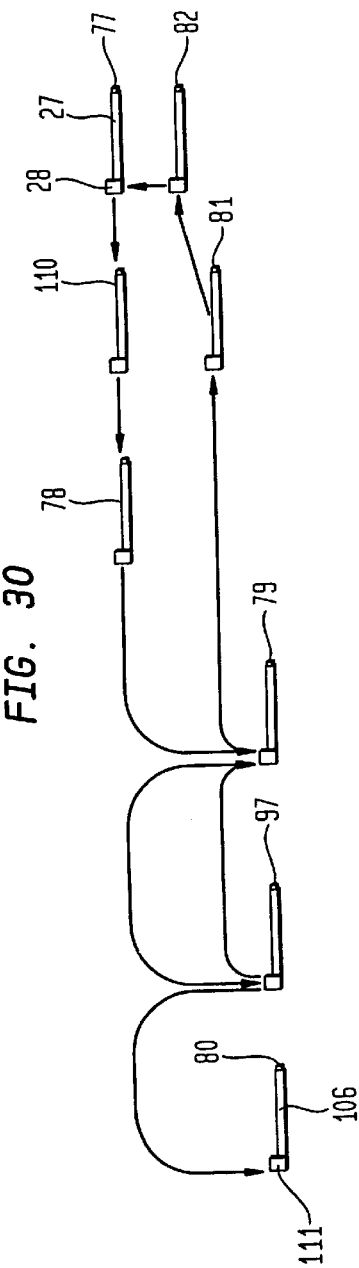
FIG. 30 shows a schematic side view sequence of a principal and a secondary robot with universal gripper assemblies from right to left: the principal robot with the universal gripper assembly picks up preforms (not shown) from the preform molding unit, indexes to an adjacent internal component-indexing sorting conveyor unit, travels to a conditioning unit, releases the preforms into a stretch-blow molding unit, returns to a waiting position, and then ascends again into an opening preform mold assembly. In the meantime, a secondary robot with a universal gripper assembly picks up the pretreated preforms (not shown) and transfers the same into a subsequent stretch-blow molding unit and oriented discharge unit.

FIG. 30 shows a schematic side view sequence basically described in connection with FIG. 26 of a robot 28 with a universal gripper assembly 27 from right to left starting at a molded preform take-out position 77, indexing to an internal component inserting position 110, traversing to a preform conditioning position 78, descending onto a preform stretch blow molding position 79, leaving the pretreated molded preforms in a blow-mold assembly 41 (not shown), returning to a gripper-waiting position 81, and ascending back towards a preform pick-up position 82.

Simultaneously, a secondary robot 111 with a universal gripper assembly 106 picks up the pretreated molded preforms 89 (not shown) from the position 79 and transfers the same into a secondary or a multitude of subsequent stretch blow molding positions 97 prior to releasing the finished hollow articles in an oriented discharge position 80.

It will be understood by those skilled in the art that each of the elements described above, or two or more together, may also be used in alternate methods of producing molded articles therein and in other methods and apparatuses for the preparation of molded articles.

While the invention has been described in detail in the foregoing specification and drawings as embodied in the context of a single-row and a multi-row stretch blow molding method and apparatus for the preparation of molded articles, it will be appreciated that the description is not intended to be limited to the details shown and various modifications and structural changes may be made without departing from the spirit and scope of the invention.

What is claimed is:

1. Method for the preparation of hollow thermoplastic articles in a stretch-blow-molding apparatus including a plasticizing unit, a robot having a universal gripper assembly, a preform-molding unit comprising a preform mold having a neck-ring clamp and an injection-core clamp, a conditioning unit, a stretch-blow-molding unit having a blow-core clamp, a stretch-rod clamp, and a stack blow-mold clamp with at least one row of blow-mold cavities, and a discharge unit, comprising the steps of (a) plasticizing raw material in the plasticizing unit to form a molten material, (b) transferring the molten material from the plasticizing unit into the closed preform mold of the preform-molding unit, (c) molding preforms in the preform-molding unit, (d) opening the neck-ring clamp of the preform-molding unit and introducing the robot with the universal gripper assembly in between the molded preforms and following the movement of the molded preforms during the preform-mold-clamp opening stroke, (e) picking up the resultant molded preforms with the universal gripper assembly of the robot simultaneously while opening the neck-ring clamp and opening the injection-core clamp, (f) transferring the preforms with the universal gripper assembly of the robot to the conditioning unit, (g) closing the preform mold clamp assembly to start a new preform molding cycle, (h) conditioning the preforms in the conditioning unit, (i) transferring the preforms with the universal gripper assembly of the robot to the blow molding unit, (j) stretch-blow-molding the preforms in the blow molding unit in at least one row of blow-mold cavities into hollow articles, (k) transferring the hollow articles with the universal gripper assembly of the robot to the discharge unit, (l) releasing the finished hollow articles from the universal gripper assembly of the robot into the discharge unit, and (m) returning the universal gripper assembly of the robot to a waiting position at the preform-molding unit prior to completion of the preform-molding cycle.

2. Method for the preparation of hollow thermoplastic articles in a stretch-blow-molding apparatus including a plasticizing unit, a robot with a universal gripper assembly, a preform-molding unit comprising a preform mold having a neck-ring clamp and an injection-core clamp, a conditioning unit, a stretch-blow-molding unit having a blow-core clamp, a stretch-rod clamp, and a stack blow-mold clamp with at least one row of blow-mold cavities, and a discharge unit, comprising the steps of (a) plasticizing raw material in the plasticizing unit to form a molten material, (b) transferring the molten material from the plasticizing unit into the closed preform mold of the preform-molding unit, (c) molding preforms in the preform-molding unit, (d) opening the neck-ring clamp of the preform-molding unit and introducing the robot with the universal gripper assembly in between the molded preforms during the preform-mold-clamp opening stroke, (e) picking up the resultant molded preforms with the universal gripper assembly of the robot simultaneously while opening the neck-ring clamp and opening of the injection-core clamp, (f) transferring the preforms with the universal gripper assembly of the robot to the conditioning unit;

(g) closing the preform mold clamp assembly to start a new preform molding cycle, (h) conditioning the preforms in the conditioning unit, (i) transferring the preforms with the universal gripper assembly of the robot to the blow molding unit, (j) stretch-blow-molding the preforms in the blow molding unit in at least one row of blow-mold cavities into hollow articles, (k) transferring the hollow articles with the universal gripper assembly of the robot to the discharge unit, (l) releasing the finished hollow articles from the universal gripper assembly of the robot into the discharge unit, and (m) returning the universal gripper assembly of the robot to a waiting position at the preform-molding unit prior to completion of the preform-molding cycle, and (n) laterally moving the upper blow-mold clamp assembly on linear bearings to facilitate mold and tooling mounting.

3. Method in accordance with claim 2 further comprising the step of spacing all processing units individually to allow turning and adding units as the molding process requires.

4. Method for stretch-blow molding finished hollow articles in accordance with claim 2 further comprising picking up preheated preforms from a lateral reheating unit with a pivoting robot having a universal gripper assembly.

5. Method for stretch blow molding finished hollow articles with external components in accordance with claim 2 comprising the steps of (a) lowering molten preforms by a robot with a universal gripper assembly into a closing blow mold and stretch blowing the molten material against components placed into the blow mold halves during a previous molding cycle, (b) picking up and holding components with a following component transfer device adjacent to the blow mold unit during the blow molding phase, (c) returning a robot with the universal gripper assembly to a waiting position at a preform molding unit after releasing finished hollow articles in an oriented discharge unit, and (d) placing the external components with following component transfer devices into the now open and empty blow mold halves during the waiting phase of the universal gripper assembly.

6. Method for stretch blow molding of finished hollow articles with internal components in accordance with claim 2 comprising the steps of:

(a) picking up and guiding molded preforms at elevated temperatures to an internal component inserting unit with a robot and a universal gripper assembly, (b) placing internal components with inserting devices inside the molten preforms prior to the completion of their shrinkage phase, and (c) guiding the molten preforms with inserted internal components to conditioning and stretch-blow and discharge units for the manufacture and release of hollow articles.

7. Method for stretch-blow molding finished hollow articles with a multitude of stretch blow mold units in accordance with claim 2 comprising the steps of:

(a) placing molded and conditioned preforms into a first blow molding unit by a robot with a universal gripper assembly and returning the robot to a waiting position for a new cycle to begin, (b) lifting the pretreated preforms out of said first blow-molding unit with a secondary robot having a universal gripper assembly and guiding them into subsequent blow-molding units for further treatment;

(c) lifting the pretreated hollow articles out of a second blow-molding unit with a secondary robot having a universal gripper assembly and guiding them into subsequent blow-molding units for further treatment, (d) lifting the finished hollow articles out of a final blow-molding unit by means of said secondary robot having a universal gripper assembly and releasing them into an oriented discharge unit.

8. Method for stretch-blow molding finished hollow articles with a multitude of blow mold rows combined in a modular stack mold including the steps of (a) opening, closing, holding and aligning the blow mold halves at selected center-row distances with a multitude of spacing means, (b) opening and closing the blow mold halves with pivoting spacing platens mounted in selected fixed positions to the center-distance rows of the preform mold rows, and (c) applying the necessary clamping force toward one another during mold closing and releasing force during mold opening by a synchronized clamp platen assembly located at each end of the modular stack blow molds and pivoting spacing platens driven by clamping means.

9. Method for stretch-blow molding finished hollow articles by transferring molten preforms from a molding machine in multi-stages through all the processing phases by a robot with a universal gripper assembly in accordance with claim 2 comprising the steps of (a) grasping the preforms by a universal gripper assembly by reaching into the opening preform mold, (b) traversing molten preforms through the processing phases of conditioning and stretch blow-molding by a universal gripper assembly, (c) releasing the finished hollow articles and returning the universal gripper assembly to a waiting position at the preform molding unit, (d) traversing each processing unit with a robot having a universal gripper assembly at variable time intervals, (e) traversing each processing unit at variable distance strokes by a robot with a universal gripper assembly, and (f) describing a freely programmable movement from a horizontal to a vertical plane with a robot having a universal gripper assembly, enabling the grasping of molten preforms with different neck portion diameters and a multitude of mold-cavity distances.

10. Apparatus for producing finished hollow articles in a single and multi-row stack blow mold clamp including (a) a plasticizing unit for plasticizing raw material, (b) a preform molding unit having a frame clamp platen to mount neck-split holding bars adapted with neck splits at freely adjustable center-row distances in accordance with the equivalent preform-mold-center distances, the molding unit sliding on tie-bars between a fixed upper platen and a base machine platen, (c) a clamp platen housing mounted on the frame clamp platen which holds the clamp platen for the different rows of injection cores according to the center-distance rows of the neck split bars and neck splits, (d) a conditioning unit with a clamp platen and holding bars for mounting conditioning rods at freely adjustable center-row distances and heat-pots at center-row distances according to the equivalent preform-mold center-row distances, (e) a stretch-blow unit having a frame clamp platen to mount blow core holding bars with blow cores at freely adjustable center-row distances according to the equivalent preform-mold center distances sliding on tie-bars between a fixed upper platen and a base machine frame, (f) a frame housing mounted onto the frame clamp platen holding the clamp platen for the different rows of stretch rods according to the center-distance rows of the blow-core bars and blow cores, (g) a stretch-blow unit having a stretch rod and blow core assembly movable laterally on linear bearings to facilitate mold and tooling mounting, (h) a modular stack blow mold clamp assembly having a plurality of pivoting spacing means to open, close, hold, and align a multitude of blow mold halves with the corresponding blow core, stretch rod, and bottom plug rows according to the equivalent preform mold center distances, (i) a stack-blow-mold clamp assembly movable synchronously with a plurality of pivoting spacing platens and a multitude of stack-blow-mold halves which maintain the corresponding center row distances of the external means entering the blow-mold cavities during operation, (j) a multitude of spacing platens variable in size according to the desired stack-blow-mold cavity opening strokes, (k) a multitude of spacing platens variable in number according to the desired number of blow-mold cavity rows, (l) an oriented discharge unit to release finished hollow articles, (m) a robot having a universal gripper assembly and opening and closing means to pick up molten preforms during the clamp opening stroke of the preform mold unit and to guide the preforms through a multitude of processing units which transform the preforms into finished hollow articles and releasing them onto an oriented discharge unit, (n) the robot having a pivotable universal gripper assembly and opening and closing means to pick up molten preforms from a lateral preform preparing unit, (o) a second robot having a universal gripper assembly to pick up pretreated hollow articles and guide them into secondary blow mold units for transformation into finished hollow articles prior to release onto an oriented discharge unit, (p) a component transfer device assembly to pick up external components from dispensing cartridges and release them into open blow mold cavities simultaneously during other processing phases, (q) a component inserting unit to place internal components inside molten preforms prior to completion of their shrinkage phase, and (r) a component-inserting unit to place internal liners inside molten preforms to form a multi-layer hollow article, all processing units being independently turnable in relation to each other to minimize the number of universal gripper assemblies and to speed up the mold change-over procedure.

* * * * *